US010234048B2

(12) United States Patent
Korten et al.

(10) Patent No.: US 10,234,048 B2
(45) Date of Patent: Mar. 19, 2019

(54) SYSTEM AND VALVE FOR WATER USE MONITORING AND CONTROL

(71) Applicant: Sensera, Inc., Chelmsford, MA (US)

(72) Inventors: Jerome B. Korten, New York, NY (US); David Michael Cowan, Cornwall Bridge, CT (US); Joshua Lars Peterson, Brooklyn, NY (US); Nishant Kumar, Bergenfield, NJ (US)

(73) Assignee: Sensera Inc., Woburn, MA (US)

( * ) Notice: Subject to any disclaimer, the term of this patent is extended or adjusted under 35 U.S.C. 154(b) by 0 days.

(21) Appl. No.: 15/815,241

(22) Filed: Nov. 16, 2017

(65) Prior Publication Data

US 2018/0216742 A1 Aug. 2, 2018

Related U.S. Application Data

(60) Provisional application No. 62/451,465, filed on Jan. 27, 2017.

(51) Int. Cl.
*F16K 31/126* (2006.01)
*F16K 17/20* (2006.01)
(Continued)

(52) U.S. Cl.
CPC ............ *F16K 17/20* (2013.01); *F16K 1/526* (2013.01); *F16K 31/124* (2013.01); *F16K 31/126* (2013.01); *F16K 31/128* (2013.01); *F16K 31/1245* (2013.01); *F16K 37/005* (2013.01); *F16K 37/0091* (2013.01); *G01L 7/08* (2013.01); *G05D 16/02* (2013.01); *G05D 16/0636* (2013.01); *G05D 16/16* (2013.01);
(Continued)

(58) Field of Classification Search
CPC .. F16K 31/128; F16K 31/124; F16K 31/1245; F16K 31/126; F16K 1/526; Y10T 137/7831; G05D 16/16; G05D 16/02; G05D 16/0636
USPC .......................... 137/505.47; 251/32, 33, 46
See application file for complete search history.

(56) References Cited

U.S. PATENT DOCUMENTS

| 784,408 A | 3/1905 | Krichbaum |
| 1,311,536 A | 7/1919 | Smoot |

(Continued)

FOREIGN PATENT DOCUMENTS

JP 2002201680 A 7/2002

OTHER PUBLICATIONS

Notification of Transmittal of the International Search Report and the Written Opinion of the International Searching Authority from PCT/US2017/062050, dated Mar. 6, 2018.

*Primary Examiner* — Matthew W Jellett
(74) *Attorney, Agent, or Firm* — Stroock & Stroock & Lavan LLP

(57) ABSTRACT

A valve assembly capable of converting a small leak of a device into a measurable, relatively larger or "burst" flow event is described. In certain embodiments, the valve assembly includes a compliant chamber and, following pressurization of the device, permits flow when the pressure in the compliant chamber drops to a configured fill pressure and restricts (or prevents) flow when the pressure in the compliant chamber increases to a shut-off pressure. The disclosed valve assemblies may be incorporated into a leak detection assembly capable of transmitting usage and/or alarm data to a central service.

10 Claims, 29 Drawing Sheets

(51) Int. Cl.
| | |
|---|---|
| *F16K 31/124* | (2006.01) |
| *G05D 16/16* | (2006.01) |
| *G05D 16/02* | (2006.01) |
| *F16K 31/128* | (2006.01) |
| *G05D 16/06* | (2006.01) |
| *F16K 1/52* | (2006.01) |
| *F16K 37/00* | (2006.01) |
| *G01L 7/08* | (2006.01) |
| *G06Q 50/06* | (2012.01) |

(52) U.S. Cl.
CPC ............... G06Q 50/06 (2013.01); *Y04S 10/54* (2013.01); *Y10T 137/7831* (2015.04)

(56) References Cited

U.S. PATENT DOCUMENTS

| | | | |
|---|---|---|---|
| 2,661,023 | A | 12/1953 | Griswold |
| 2,912,997 | A | 11/1959 | Griswold |
| 4,491,149 | A * | 1/1985 | Trinkwalder ...... G05D 16/0688 137/458 |
| 4,838,310 | A | 6/1989 | Scott |
| 4,905,688 | A * | 3/1990 | Vicenzi ................. A61M 16/00 128/201.25 |
| 5,007,453 | A | 4/1991 | Berkowitz |
| 2013/0206242 | A1 | 8/2013 | Hurst |

* cited by examiner

SYSTEM AND VALVE FOR WATER USE MONITORING AND CONTROL

CROSS REFERENCE TO RELATED APPLICATIONS

The present application claims the benefit of U.S. Provisional Application Ser. No. 62/451,465, filed Jan. 27, 2017, for Device and System for Water Use Monitoring and Conservation, the entire contents of which is hereby incorporated by reference.

FIELD OF THE INVENTION

The present invention relates generally to water conservation and, more particularly, to water use monitoring and control devices and systems.

BACKGROUND OF THE INVENTION

In general, the detection of slow leaks, for example, in toilets, sinks or other valved water outlet device, are not detectable by human observation and may occur unobserved. It has been shown that a leak of one drop per second can result in a yearly waste of 10,000 liters of water. For apartment buildings with hundreds of toilets, for example, the potential economic impact of water waste is significant. In those geographical areas where water is scarce, the importance of conservation is equally important as the economic impact. Accordingly, a need exists for devices and systems to monitor, detect and, ideally, control leaks, including slow leaks.

SUMMARY

Embodiments of the present invention solve the foregoing and other needs. A valve assembly for use between a fluid source, having an inlet pressure, and a valved device, such as a toilet or sink, according to one embodiment will now be summarized. The valve assembly has an inlet, wherein the inlet is in fluid communication with the fluid source when the valve assembly is in use and an outlet, wherein the outlet is downstream of the inlet and is in fluid communication with the valved device when the valve assembly is in use. A main valve is located between the inlet and outlet and operates in either an open state or closed state. A pressure compliant chamber in fluid communication with the outlet, downstream of the main valve, and has a pressure when the valve assembly is in use. As such, the pressure in the compliant chamber is reflective of the state of the valved device (e.g., leaking, filled or pressurized). A pressure sensor, such as a piston, diaphragm or other device, is gradually responsive to changes in pressure of the compliant chamber, for example, by being in fluid communication with the compliant chamber. A pilot valve in fluid communication with the main valve is responsive to the pressure sensor and operates in either an open state or closed state, wherein when the pilot valve is open, the main valve is open, thereby permitting flow of fluid from the inlet to the outlet, and when the pilot valve is closed, the main valve is closed, thereby preventing flow of fluid from the inlet to the outlet. Also, the pilot valve is in the closed state when the compliant chamber is pressurized at or about the inlet pressure and remains in the closed state until the pressure in the compliant chamber decreases to a fill pressure, less than the inlet pressure. The pilot valve toggles from the closed state to the open state, thus opening the main valve, when the pressure in the compliant chamber decreases to at or about the fill pressure and remains in the open state and transitions from the open state to the closed state when the pressure in the compliant chamber increases to at or about a shut-off pressure. The fill pressure is lower than the shut-off pressure.

It should be understood that although the present embodiments are described in terms of water devices, the inventions described herein may be applied to other fluids or even gases.

BRIEF DESCRIPTION OF THE DRAWINGS

Embodiments of the invention will be described and shown in detail by way of example with reference to the accompanying drawings in which.

DETAILED DESCRIPTION OF CERTAIN EMBODIMENTS

In general, embodiments of the present invention include valves and systems for detecting and communicating water usage and leaks using such valves. Furthermore, certain embodiments include valve assemblies that may be used to stop leaks. In certain embodiments, the water use monitoring device is intended for monitoring and reporting small leaks. In addition, the water use monitoring device is also intended to detect catastrophic leak situations that occur, for example, when a toilet overflows. Although certain embodiments of the water use monitoring devices and systems are described for use in the feed to a toilet, it is to be understood that the systems and components may be applied to other uses, including, for example, a sink or other valved water outlet device, in which the water use monitoring device preferably resides between the shutoff valve for the valved water outlet device and the device itself.

Figure 1:
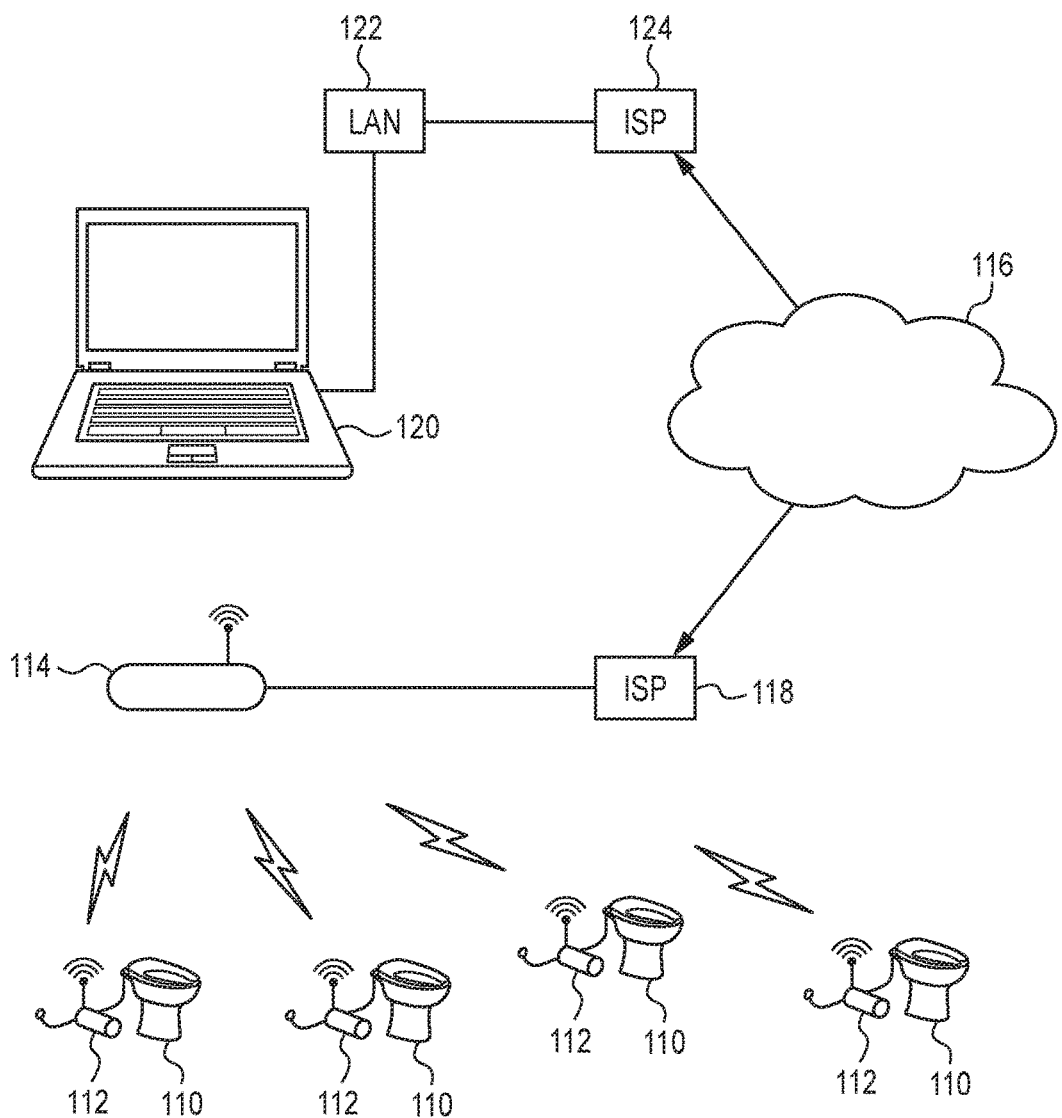
FIG. 1 is a schematic showing certain components according to one embodiment of the present invention.

Turning first to FIG. 1, there is shown a general schematic of one monitoring system according to the present invention. As illustrated, one or more toilets 110 each has a monitoring device residing between the shutoff valve for the water supply in the toilet itself. Each monitoring device 112 is preferably in communication with a router 114 that is in communication with a network, such as the Internet, or cloud service 116, for example via an Internet service provider (ISP) 118. As such, data from the monitoring devices 112 may thus be wirelessly collected. Also in communication with cloud service 116 is a monitoring computer 120. Monitoring computer 120 (e.g., personal computer, smart phone or other computing device) may be in communication with the cloud service 16 in any of a number of ways, including via a local area network 122 in communication with an Internet service provider (ISP) 124. Monitoring computer 120 may have any number of user interfaces for viewing the data collected via the monitoring devices 112 and receiving (and generating) reports and alerts based thereon.

The water monitoring devices 112 may be networked in any number of ways, for any number of purposes. For example, as shown in FIG. 1, a plurality of water use monitoring devices can be deployed in a building (e.g., each toilet 110) with each connected to one or more wi-fi routers 114 on a local area network or with a network attached data gateway, or each of the water use monitoring devices 112 can connect to one or more smartphones via Bluetooth and the data from each sent to a central service or application for the collection and analysis of the data. The data can then be accessed by a computer program (residing on the computer 120 or remotely, such as part of the cloud service 116) that may display on the monitoring computer 120 the status of one or more or each of the multiple water use monitoring devices 112 (for example, by one who is responsible for paying the costs associated with supplying water) to monitor the status of the various water use monitoring devices 112 and learn whether there exist leaks or excessive use (e.g., receive an alarm generated by the embedded processor of the water monitoring device 112). Alerts can be generated automatically when detected usage exceeds one or more thresholds. Alerts can be displayed and maintenance tickets automatically generated. This software program or the cloud service 116 can also push content regarding water usage to the owner of the water use monitoring device 112 or to the person monitoring the computer program so that a user is not required to log in to view the status in the case where there is an abnormal water usage pattern that requires immediate attention.

The water use monitoring device 112 (microprocessor) can optionally be programmed to trip/activate the main valve to the closed state should a flow condition exist that is considered a potential hazard, such as a continuous flow for a period of time longer than it takes to fill a toilet tank (e.g., as indicated by the generator/turbine generating current above a threshold for more than a predetermined amount of time). Alternatively, an audible alarm can be activated if a long duration flow exists that indicates the threat of flooding. The water use monitoring device can optionally be programmed to also trip the main valve to a closed state should the toilet not be used for more than a certain amount of time (for instance 6 months) in which case the battery will no longer be viable and it would be considered safe to shut down the toilet. The water use monitoring device 112 can be constructed so that a manual override (e.g., manually resetting the same or separate valve to an open flow position) is required to re-open the pilot valve in the case where the valve was tripped closed for any of the reasons cited in this paragraph or otherwise.

Figure 2:
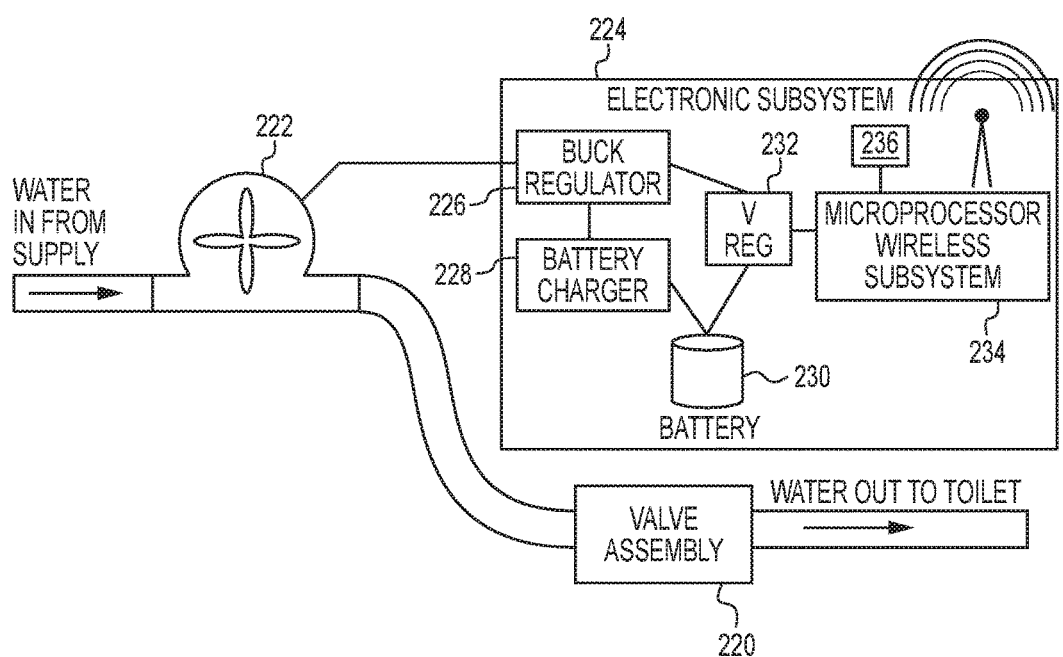
FIG. 2 is a schematic showing a monitoring device according to one embodiment of the present invention.

FIG. 2 illustrates the water use monitoring device 112 of one embodiment. In general, the water use monitoring device 112 comprises of the following components: a low flow detection valve assembly 220 interposed between the water supply and toilet 10; a generator/turbine or other means of converting water flow to electrical energy 222, which receives water from the supply and allows the water supply to pass to the valve assembly 220; an electronic subsystem 224, which may include a power supply, such as a buck regulator 226, battery charger 228, and battery 230, as well as a voltage regulator 232 coupled to an embedded processor wireless subsystem 234, comprising a programmable microprocessor, associated memory (e.g., with programming code) and a wireless low energy transmitter/receiver (transceiver) for communicating to the router 114; and an alarm 236 (e.g., audible and/or visual). In certain embodiments hardware circuitry may be used instead of the programmable microprocessor.

In certain embodiments, the generator/turbine mechanism comprises rare earth magnets mounted on a rotating vane that interfaces with the water flow stream on one tangent to the axis of rotation similar to a water wheel. A wire coil configuration outside of the housing is energized by these moving magnets during water flow to charge a capacitor that then powers a battery charging system to keep the rechargeable battery in a charged state.

In certain embodiments, the electronic subsystem 224 uses low current consumption technology, and is designed to be active in an episodic nature, waking up on a scheduled basis (for example, once every 24 hours, or whenever a flow event occurs as indicated by a pulse of current from the generator/turbine) to monitor the water flow and transmit the status, if any change has occurred, to the data-aggregator service (application).

Although all three subsystems—generator/turbine 222, electronic subsystem 224 and valve assembly 220—are illustrated as separate components, they may be housed in a single unit. As illustrated in FIG. 2, the output of the turbine 222 not only is coupled to the rechargeable battery 230 for recharging it, but also is coupled to the microprocessor subsystem 234 such that the flow condition (as indicated by the turbine 222) is communicated to (e.g., via a voltage regulator) and interpreted by the processor subsystem 234. The low energy transmitter/receiver can be Blue Tooth Low Energy (BLE), WiFi IEEE802.11, or other wireless network topology, including Zigbee, HaLow or other depending on the desired end user interface. Furthermore, in alternate embodiments, a power source other than rechargeable battery 232 is used, such as a replaceable battery, conventional wall outlet, solar panel, and other sources.

The low flow detection valve assembly 220 is preferably capable of determining the presence of low flows or small leaks (e.g., at least 1 drop per second or about 1 ml per second), in addition to high flows or larger leaks. The assembly 220 also preferably detects and quantifies high flows due to normal operation (e.g., flushing of the toilet 110) through the output of the generator/turbine 222. Moreover, the valve assemblies described herein detects such flows and leaks without restricting flow, thereby permitting normal flow to and use of the connected device, such as a toilet or sink. For example, the generator/turbine 222 generating a current pulse equal to that associated with flushing for a duration within the range of typical flushes for the particular toilet at issue. The energy harvested from the water flow during high flow operation may be used to recharge battery 230 that runs the radio transmitter and embedded processor that monitors and communicates the status of the water flow. In addition, in certain embodiments the embedded processor is capable of activating an alarm 36 or to control a valve (either separate or part of the valve assembly 220) to disable water flow, for example, in response to a flow condition persisting for an amount of time that exceeds a pre-programmed period which is determined to indicate a fault condition. Additionally, algorithms may be deployed part of the microprocessor (e.g., programmed as firmware) that learn typical water usage and shut off the water supply should non-typical use be detected (e.g., identifying periods of sporadic usage, such as would be expected with limited, sporadic flushes at night while occupants sleep, or periods of relatively high expected usage, such as when children come home from school each day, resulting in multiple flushes in close temporal proximity).

This water use monitoring device 112 may be constructed with the ability to use one of several means of detecting flow of a fluid such as water. In the embodiment of FIG. 2, water flow through the system actuates a hydraulic generator by spinning a turbine 222. Thus, whenever a toilet 110 is flushed, an amount of electrical current is generated (that, for example, may be proportional to the amount of water flowing). This high flow information may be used by the electronic subsystem 224 to determine large leak conditions or overflow situations (e.g., continuous high flow, as indicated by sustained current above a predetermined threshold for at least or greater than a predefined duration) and to determine usage patterns (e.g., no flushes at certain times; greater absolute or relative usage at certain times).

For detecting slow, including very low leaks (e.g., <=1 ml/sec), a secondary strategy may be employed, which utilizes a specialized low flow detection valve assembly 220 to convert a gradual loss of volume into a relatively larger or burst flow event that is more easily detected. In certain embodiments, to achieve this, a compliant volume that is under pressure when the toilet filled, is drained slowly over time by the leak (e.g., leaky toilet flap) and when this volume has physically collapsed to a predetermined level, a mechanical state transition occurs creating a mechanical action. This mechanical action may include the opening of a main valve that permits the sudden (immeasurable) flow of water.

Figure 3:
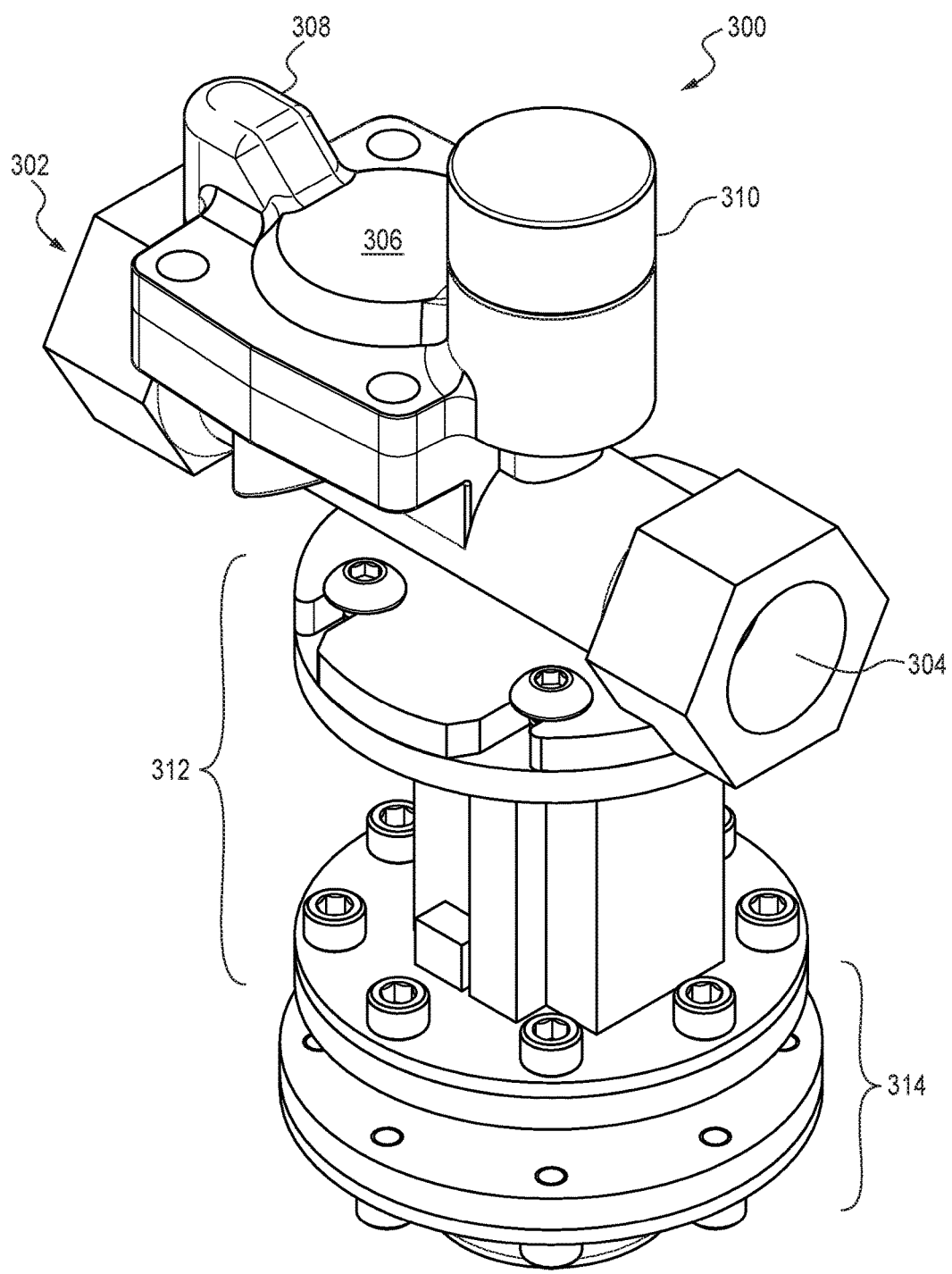
FIG. 3 is a perspective view of a valve assembly according to one embodiment of the present invention.

A valve assembly 300 according to one embodiment will now be described in greater detail with reference to FIGS. 3-19. By way of overview, turning first FIG. 3, the valve assembly 300 generally includes an inlet 302 for receiving a water supply and an outlet 304 for delivering water to the device, such as toilet 110. The valve assembly 300 further includes a main valve 306, flow restrictor 308, pilot valve 310, latch assembly 312, which as described below, houses several components, and piston 314. The latch assembly 312 and piston 314 are in a sealed housing (in the present embodiment, assembled from multiple housings) in fluid communication with a compliant chamber 303, which is downstream of the main valve 306. As such, the water may travel to the compliant chamber 303 through the latch assembly housing, into the piston, such that the piston 314 is able to move in response to the water pressure (or lack thereof) in the compliant chamber 303. Thus, the piston 314 serves as a pressure sensor.

In general, main valve 306 includes a main valve diaphragm 410 (also shown in FIG. 10) and main valve spring 412. The main valve diaphragm 410 defines a back chamber 413 of the main valve 306. In general, the main valve 306 is capable of closing and thus sealing off inlet pressure when the pilot valve 310 is closed and pressurized.

Pilot valve 310 includes pilot valve plunger 420 (also shown in FIG. 11), pilot plunger spring 422, pilot plunger seal 424, pilot actuation pin 426 coupled to the pilot plunger seal 424 and pilot spring 428. Generally speaking, pilot valve 310 operates in a binary mode of operation, between two states: when the pilot actuation pin 426 is up, the pilot valve 310 is open, and unpressurized; when the pilot actuation pin 426 is down, the pilot valve 310 is closed and pressurized. Moreover, the valve assemblies operate such that the valve opens at a fill pressure, and closes at a shut-off pressure, which is greater than the fill pressure, thus operating as a pressure comparator between the inlet pressure and a compliant chamber (or outlet) with hysteresis. As shown, in the present embodiment, the pilot actuation pin 426 passes from pilot valve 306, through the main flow channel 305 (between inlet 302 and outlet 304), in the present embodiment, downstream from the main valve 306, to the latch assembly 312. The pin 426 passes through a nipple or seal 427, sealing pilot valve 310 from flow from the main flow channel 305.

Flow restrictor 308 comprises flow restrictor 416 (also shown in FIG. 12) and flow restrictor channel 418. In general, the flow restrictor 308 permits emptying of back chamber 413 of the main valve 306 via flow restrictor channel 418.

Figure 13:
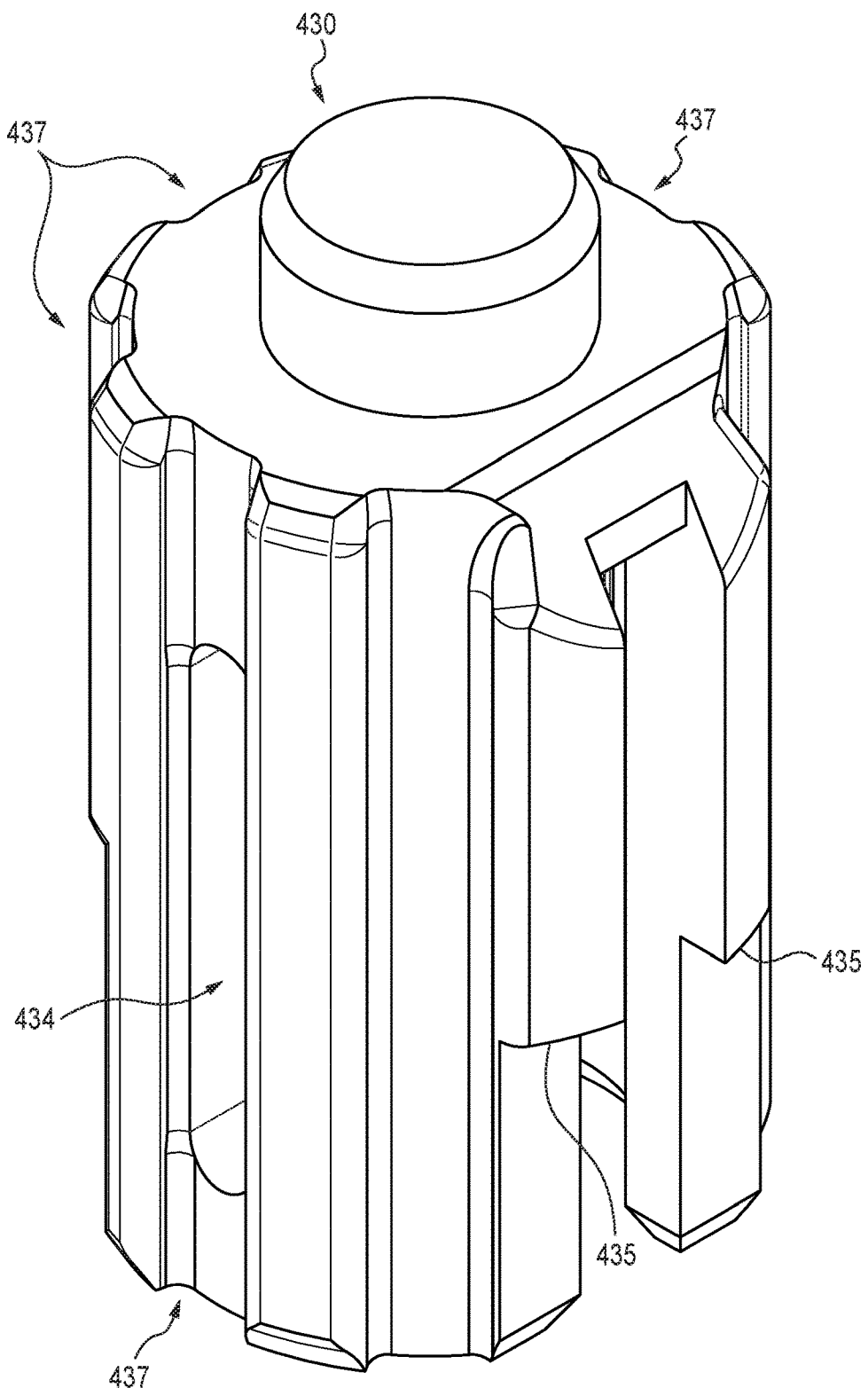
Figure 14:
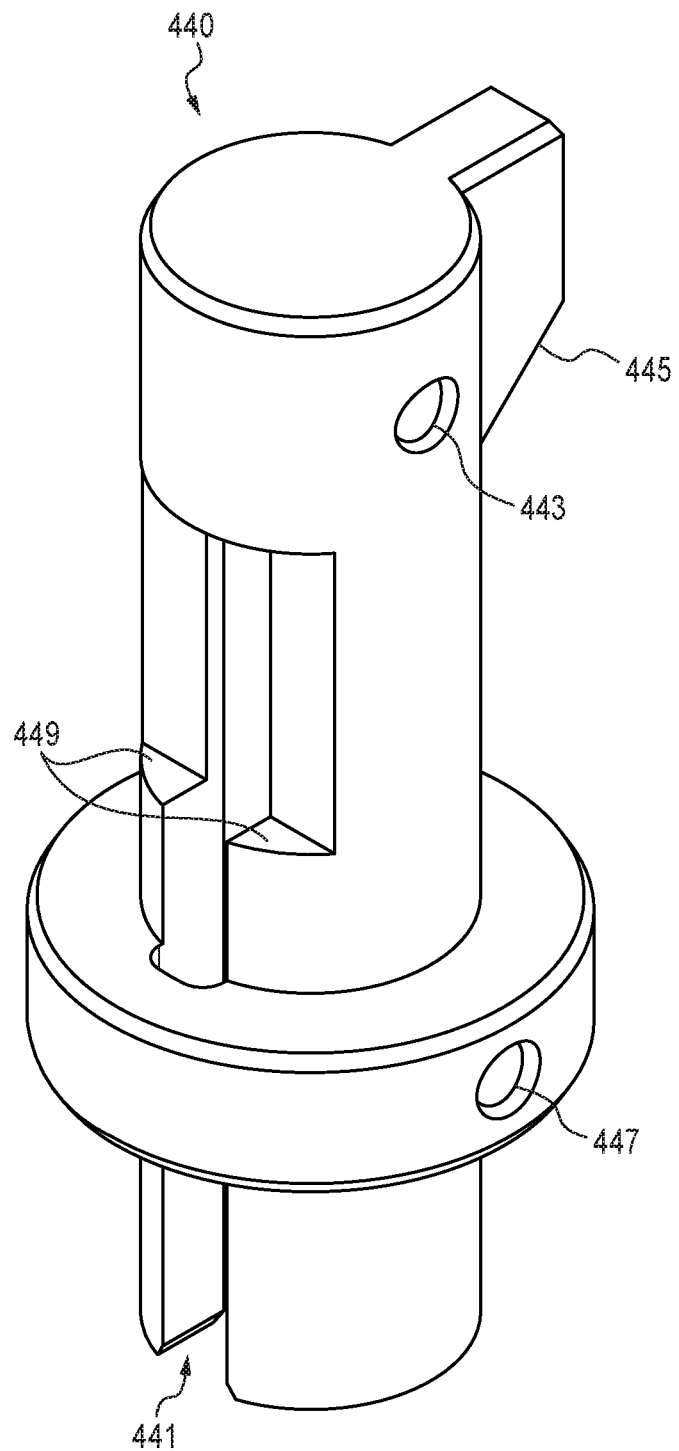
Figure 15:
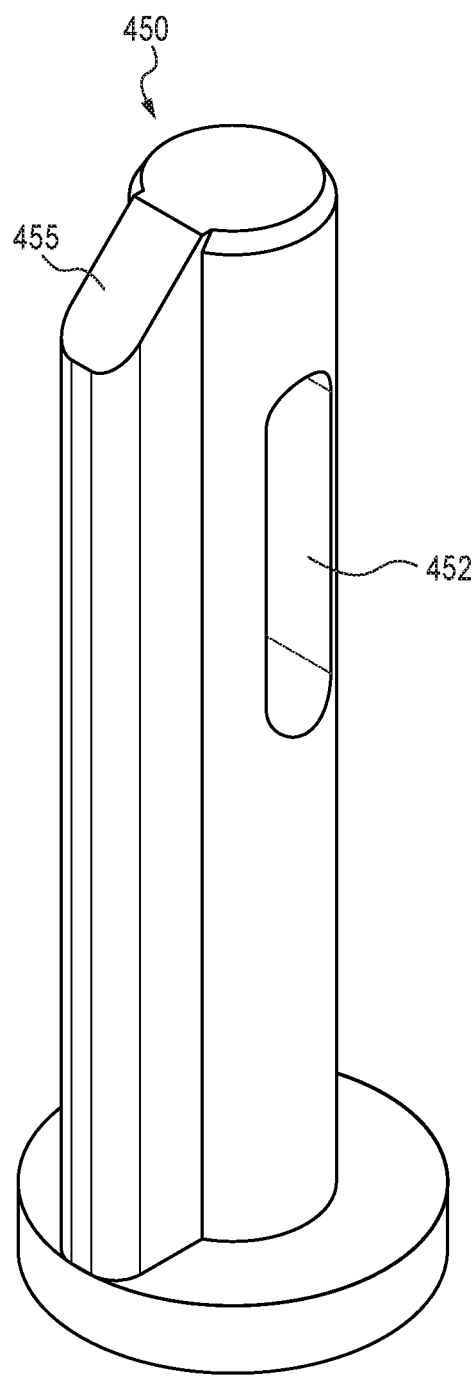
Figure 16:
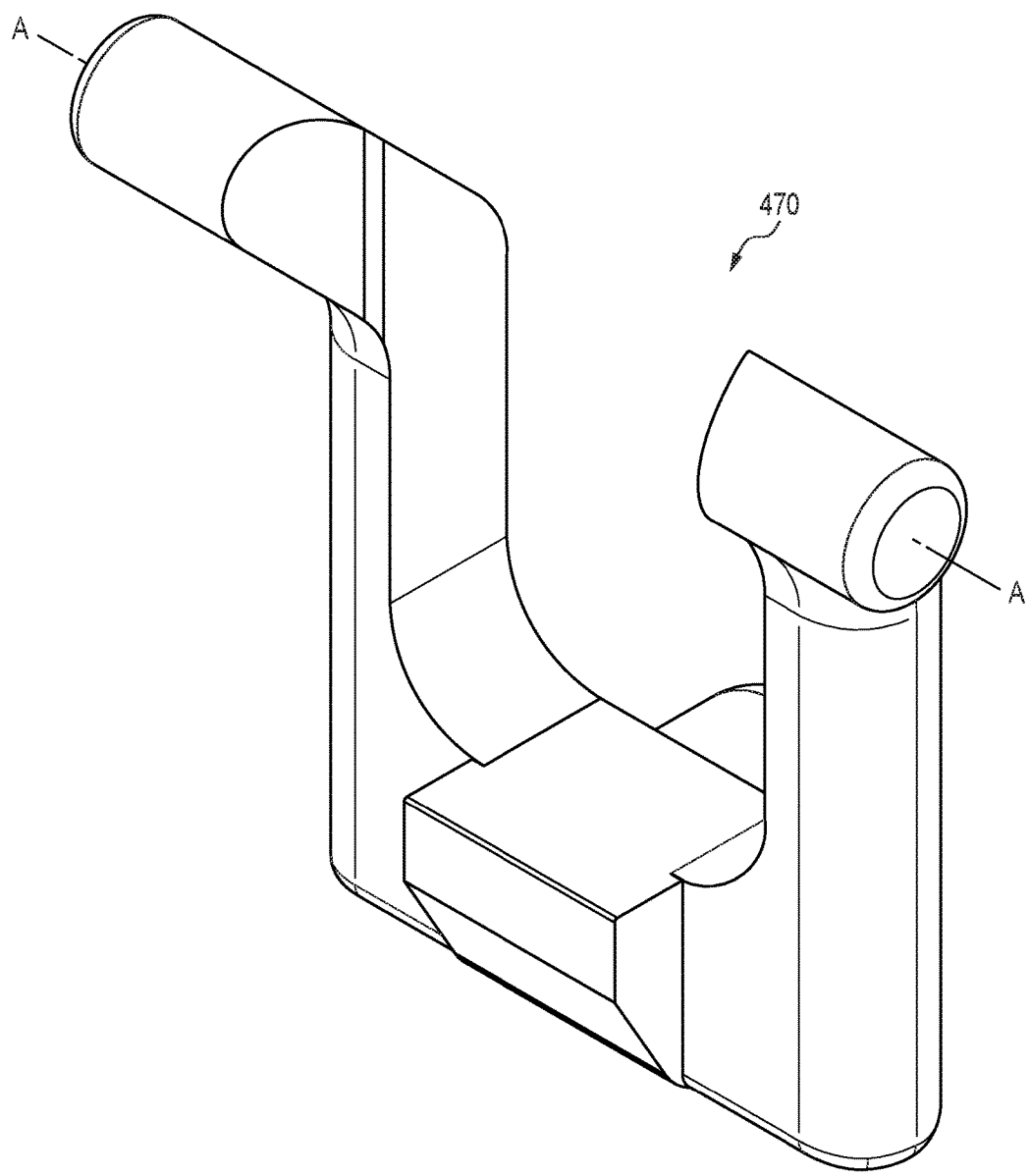
Figure 17:
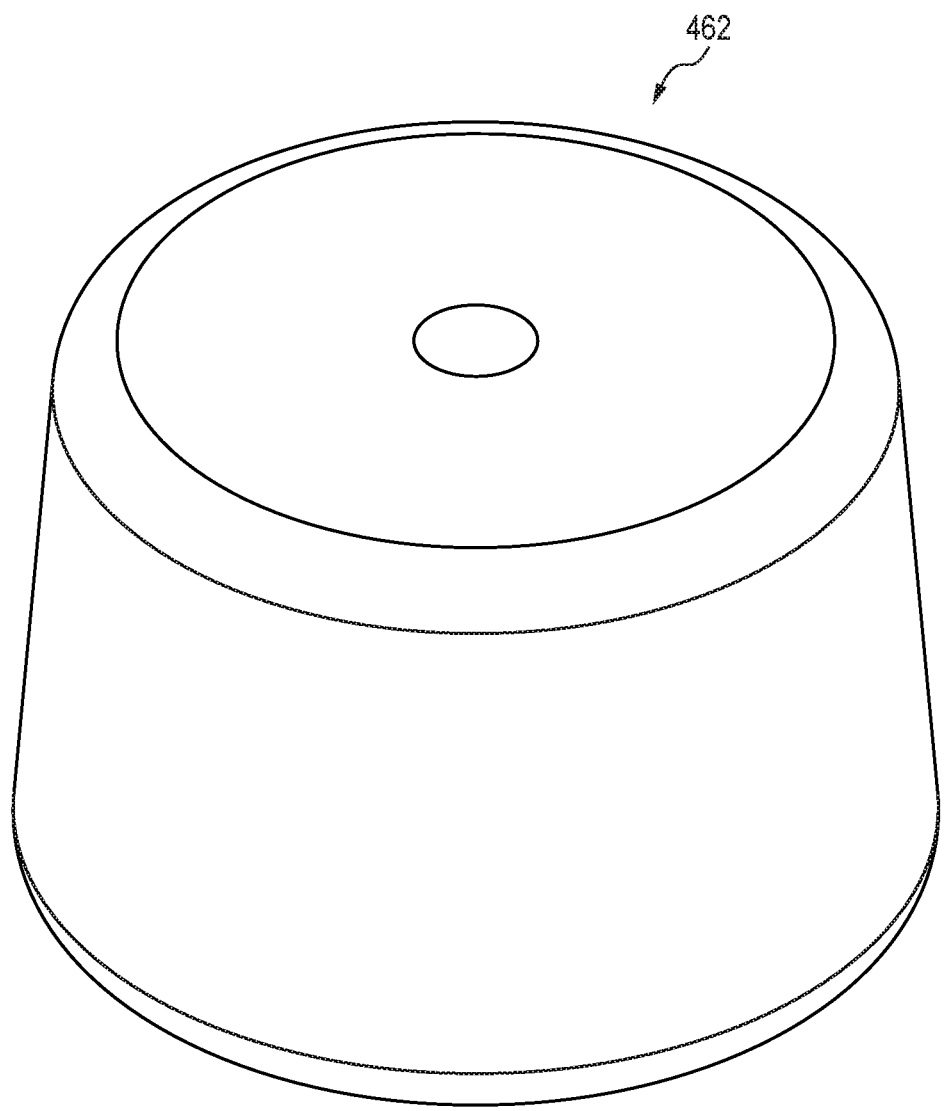
Figure 18:
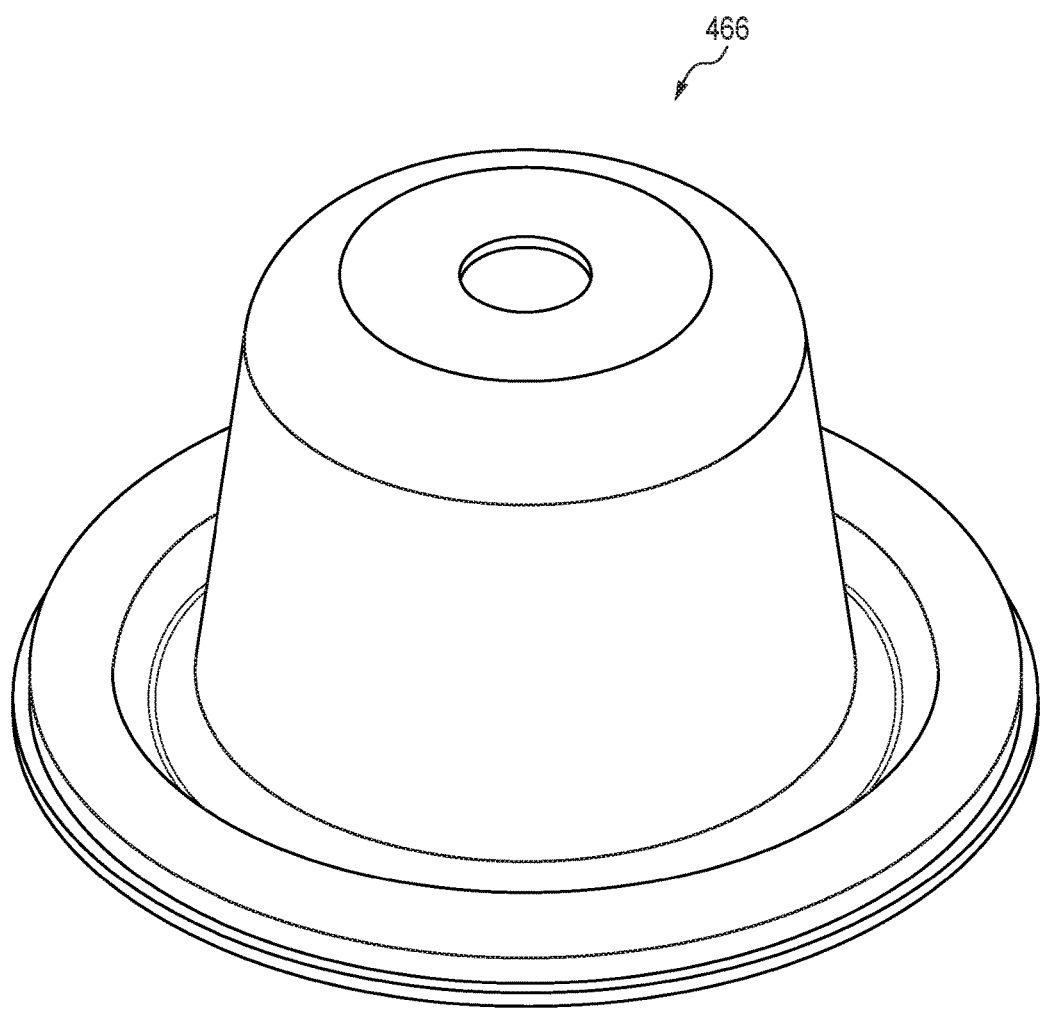
Figure 19:
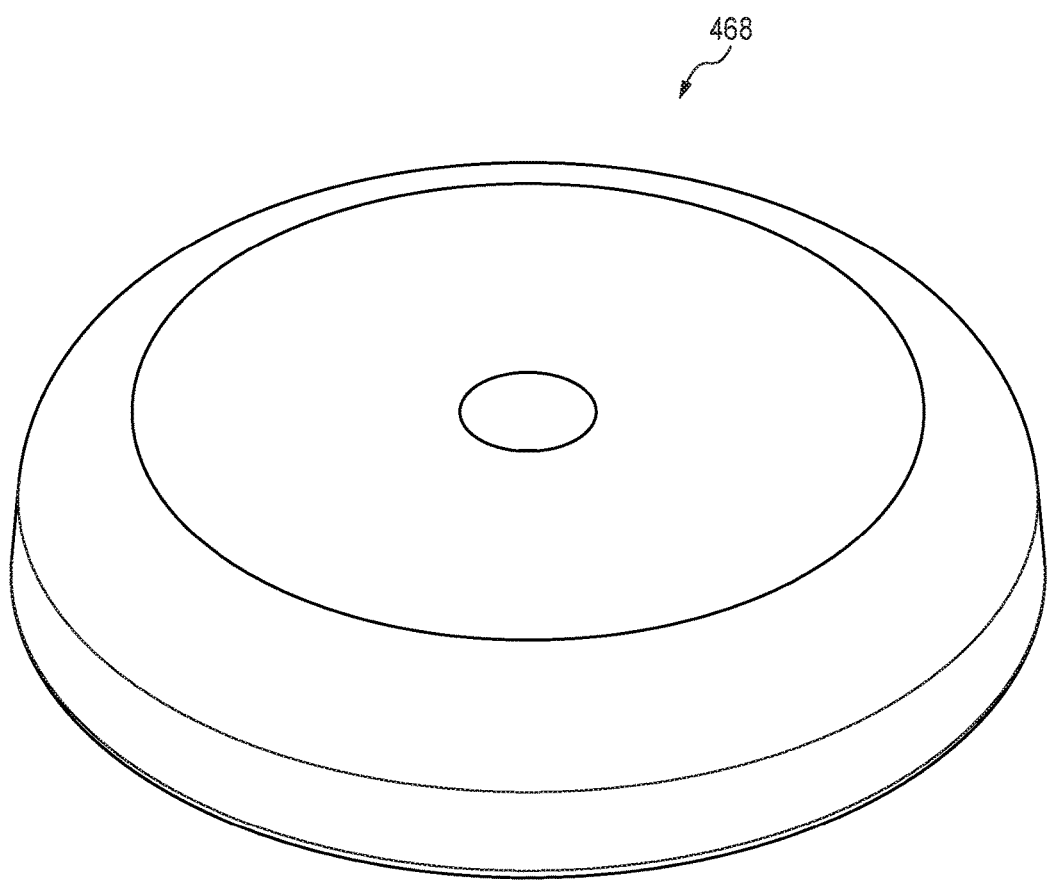
Figure 20:
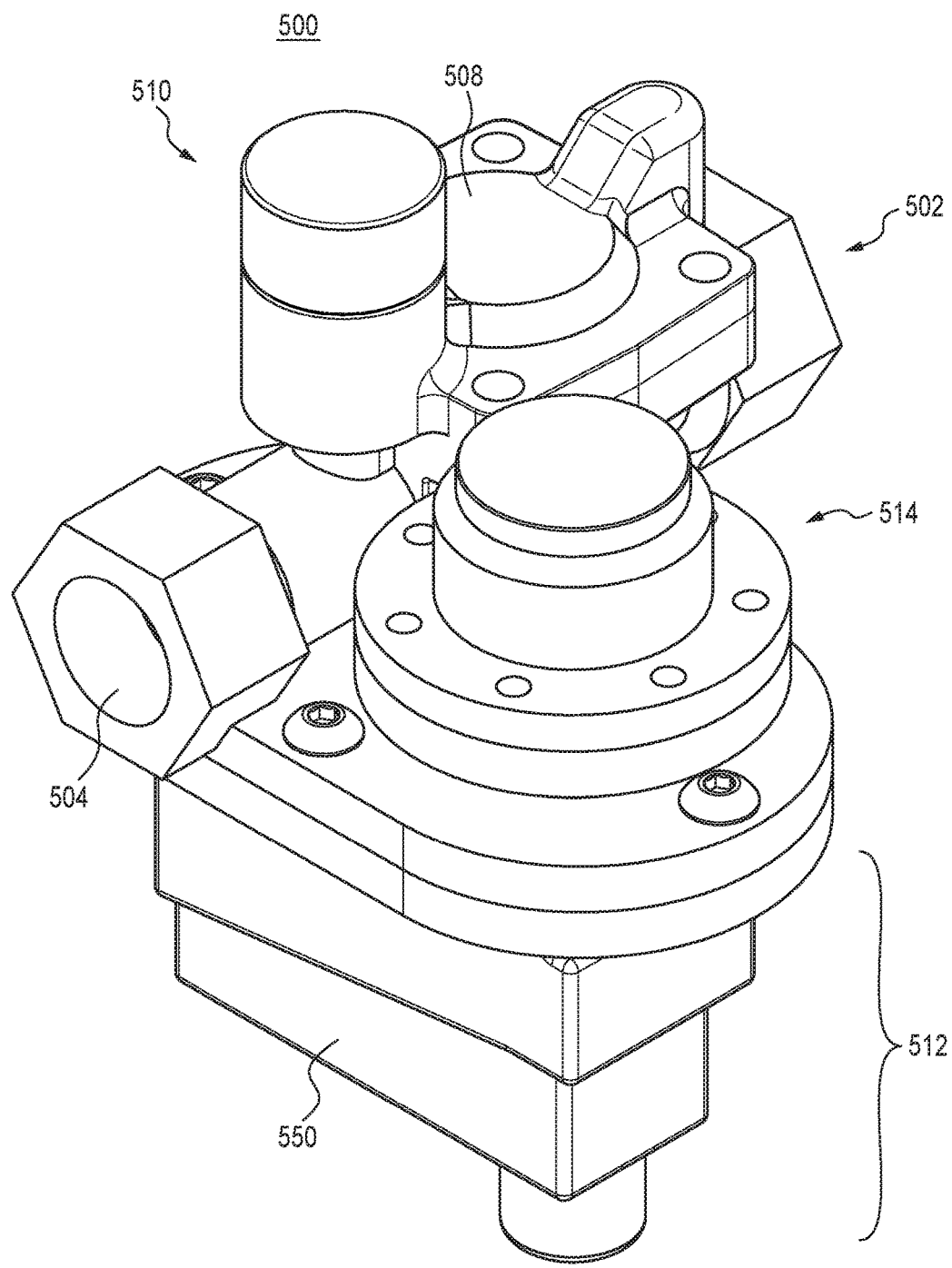
FIG. 20 is a perspective view of a valve assembly according to an alternate embodiment of the present invention.

In general, the latch assembly 312 (along with the pilot spring 428) reside, and are movable within, a latch housing. Latch assembly 312 includes a pilot slide 430 (also shown in FIG. 13) affixed to the end of the pilot actuation pin 426, a middle slide 440 (also shown in FIG. 14) and a diaphragm slide 450 (also shown in FIG. 15). Pilot slide spring 428 urges pilot slide 430 downward; middle slide spring 444, which is relatively stronger than the pilot spring 428 (in one embodiment, about 3× stronger, though other relative strengths are within the scope of the present invention), urges middle slide 440 upward. As shown in FIG. 13, pilot slide 430 includes channels 437 for permitting water (or other fluid) in the main flow channel 305 to travel past the pilot slide 430, through a channel 441 in the middle slide 440 (shown in FIG. 14) and a channel in the diaphragm slide 450 (not shown), to the compliant chamber 303 and the piston assembly 460.

The latch assembly further includes a valve close latch 470 (also shown in FIG. 16) and corresponding latch spring 472 and valve open latch 480 and corresponding latch spring 482. When valve close latch 470 is engaged with pilot slide 430, pilot slide 430 is latched upward, such that pilot valve 10 is open. As middle slide 440 moves downward, disengagement surface 445 comes in contact with valve close latch 470, eventually forcing valve close latch 470 out of engagement with pilot slide 430. When valve open latch 480 is engaged with its corresponding retention surface of middle slide 440, middle slide 440 is prevented from moving upward. When diaphragm slide 450 moves upward, disengagement surface 455 eventually contacts and disengages valve open latch 480 from its corresponding service on middle slide 440. As will be appreciated by those skilled in the art, the valve close latch 470 and valve open latch 480 cooperate with the pilot slide 430, middle slide 440, and diaphragm slide 450 to control operation of the valve assembly, setting thresholds for various states of operation.

Piston assembly 460 is coupled to diaphragm slide 450 (via screw 467). Piston assembly 460 includes piston 462 (also shown in FIG. 17) residing on diaphragm piston spring 464, which is maintained within the piston housing 314 with diaphragm spring retention cap 469. As will be appreciated based on the discussion herein, diaphragm spring 464 is the strongest of the springs, as it is used to overcome the water pressure (e.g., about 40 psi-70 psi), urging the piston 462 and diaphragm slide 450, and, in certain situations described herein, middle slide 440, pilot slide 430 and pilot actuation pin 426 upward, thus opening pilot valve 310. The piston assembly 460 also includes a rolling diaphragm 466 (also shown in FIG. 18) on the piston cap 462, which defines compliant chamber 303 and seals the piston chamber while permitting piston cap 462 to move within the piston housing 312. Piston cap 468 (also shown in FIG. 19) sits atop the rolling diaphragm 466 and abuts diaphragm slide 450, which passes through an opening, into the piston housing 314.

As will be more apparent based following discussion below, each of the pilot slide 430, middle slide 440, diaphragm slide 450, and piston assembly 460, as well as pilot valve 310, are in axial alignment and are movable along such axis. The range of relative movement between the pilot slide 430 and middle slide 440 is limited by slot 434 in pilot slide 430 receiving pin 442 (affixed in hole 443, shown in FIG. 14) in middle slide 440. Similarly, the range of relative movement between middle slide 440 and the diaphragm slide 450 is limited by slot 452 in diaphragm slide 450 receiving pin 446 in middle slide 440 (pin 446 being affixed in hole 447, shown in FIG. 14).

Figure 4:
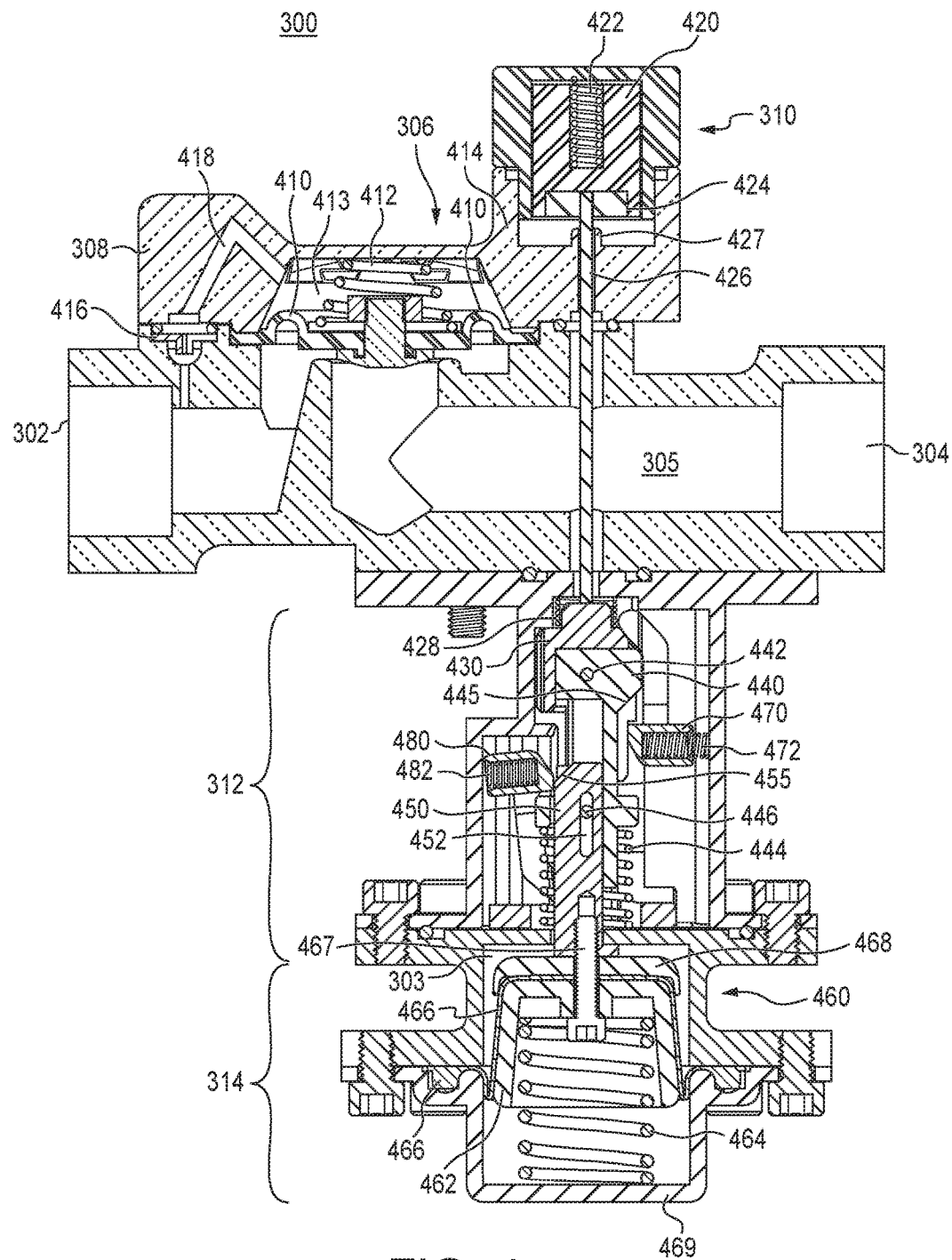
FIGS. 4-9 are cross sectional views of the valve assembly of FIG. 3 in various states of operation.
Figure 5:
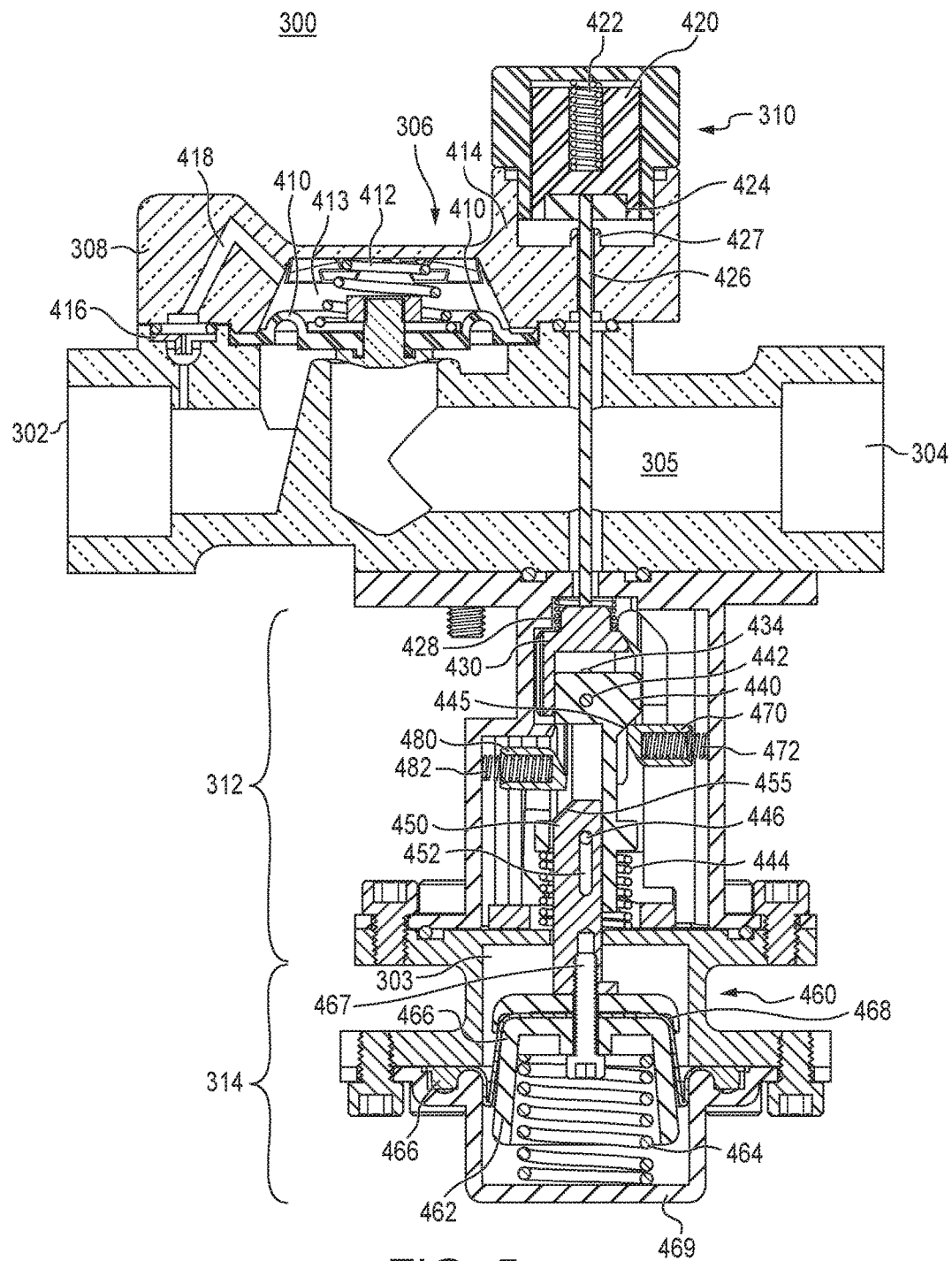
Figure 6:
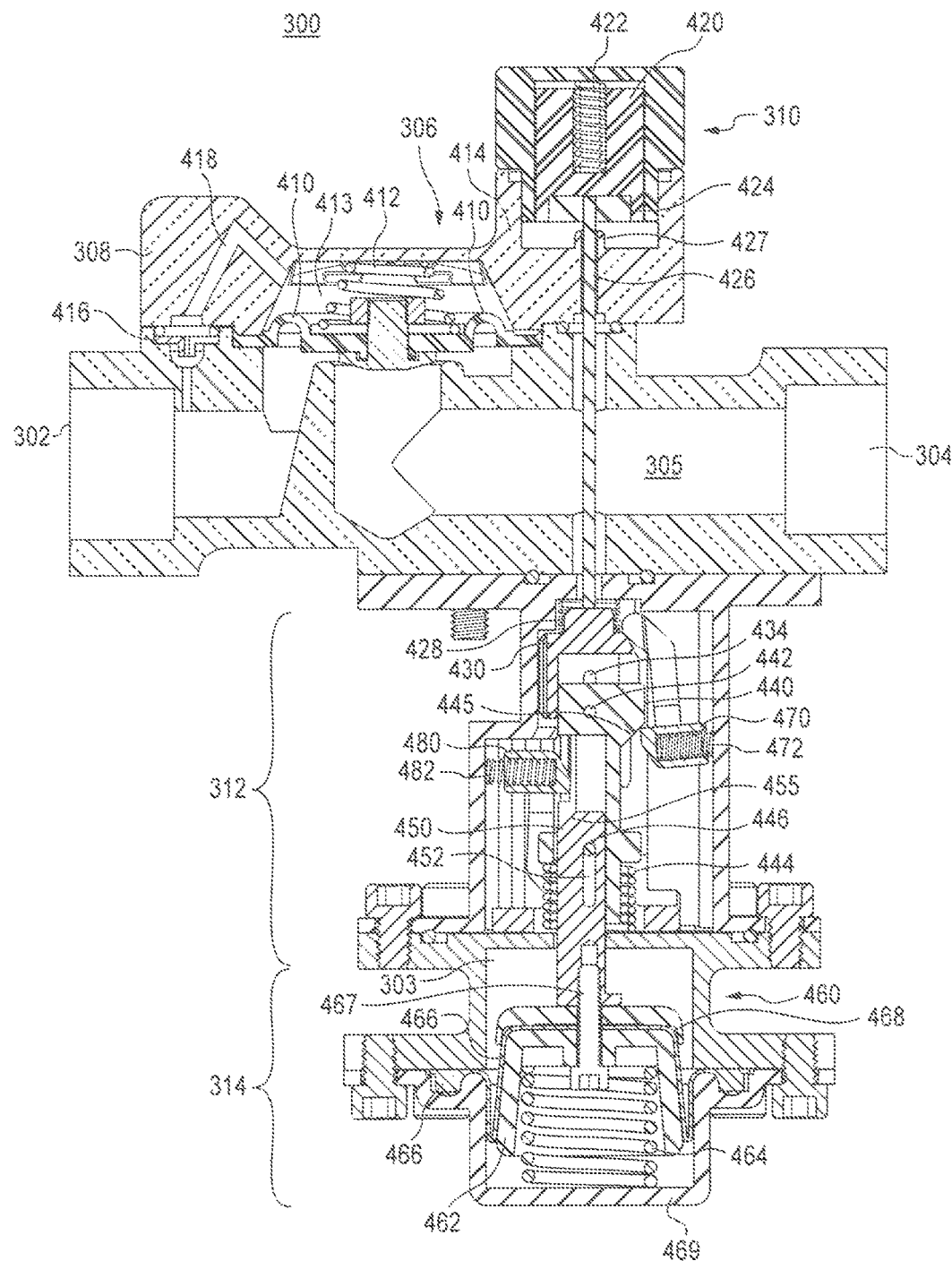
Figure 7:
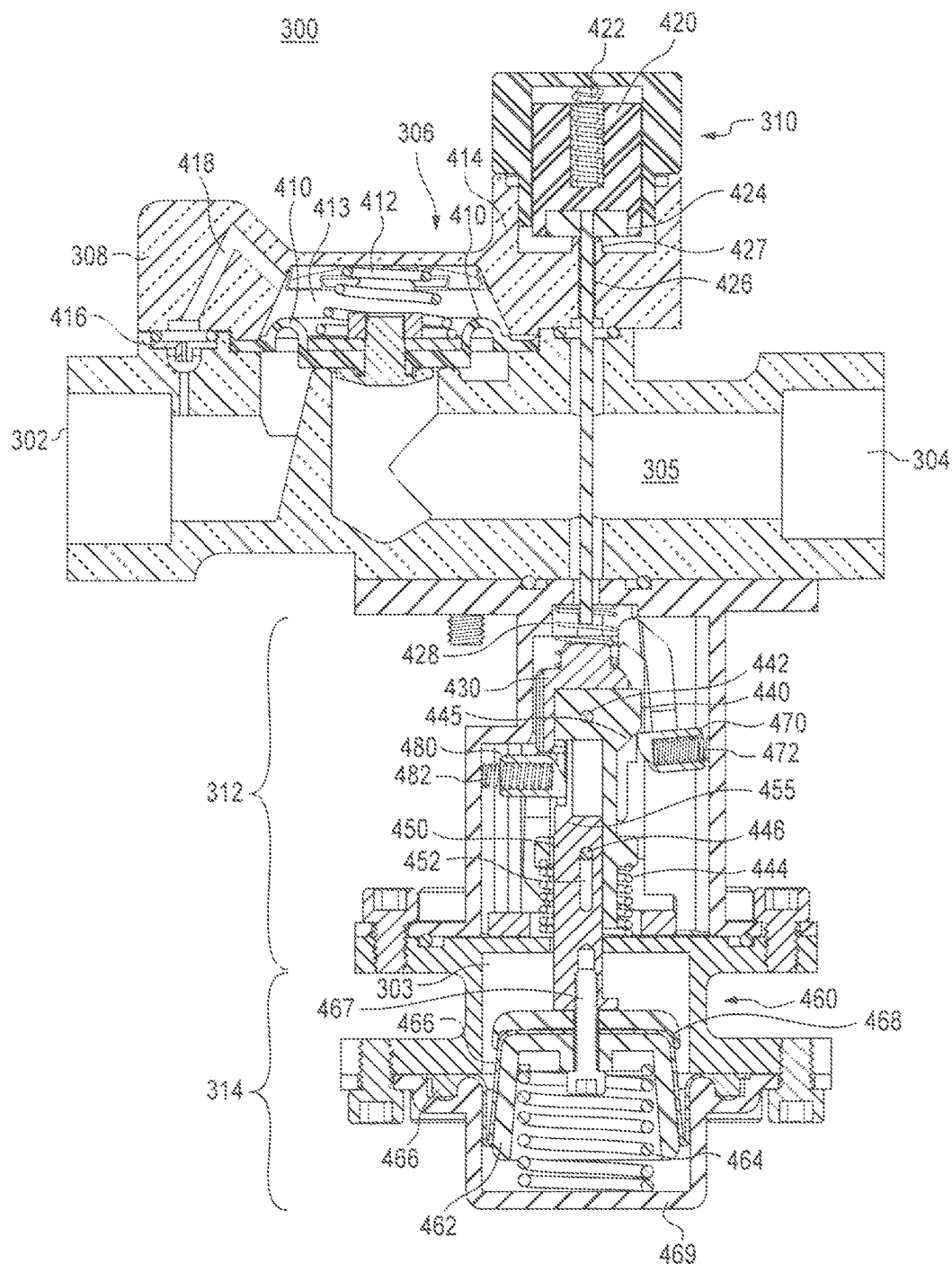
Figure 8:
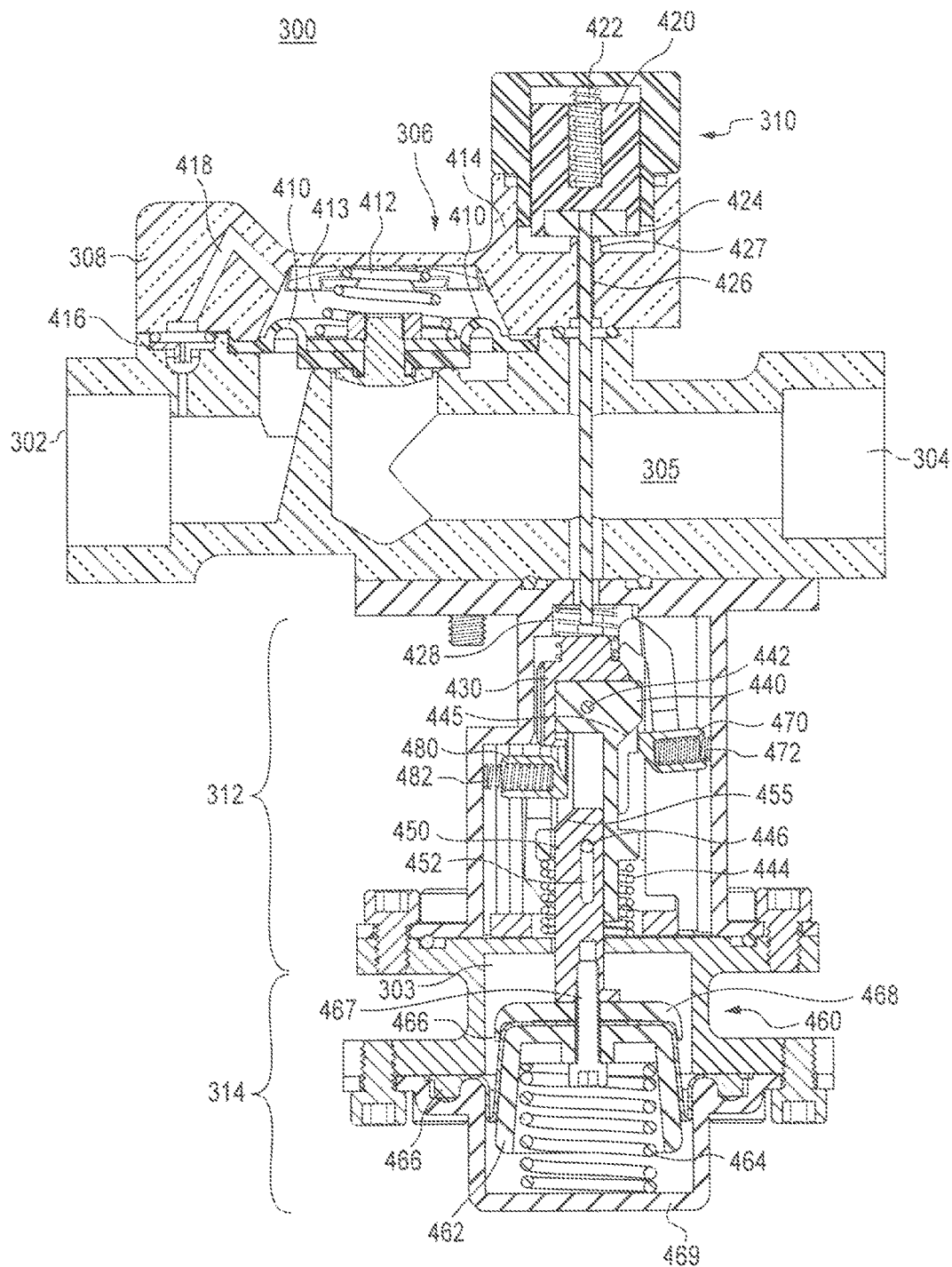
Figure 9:
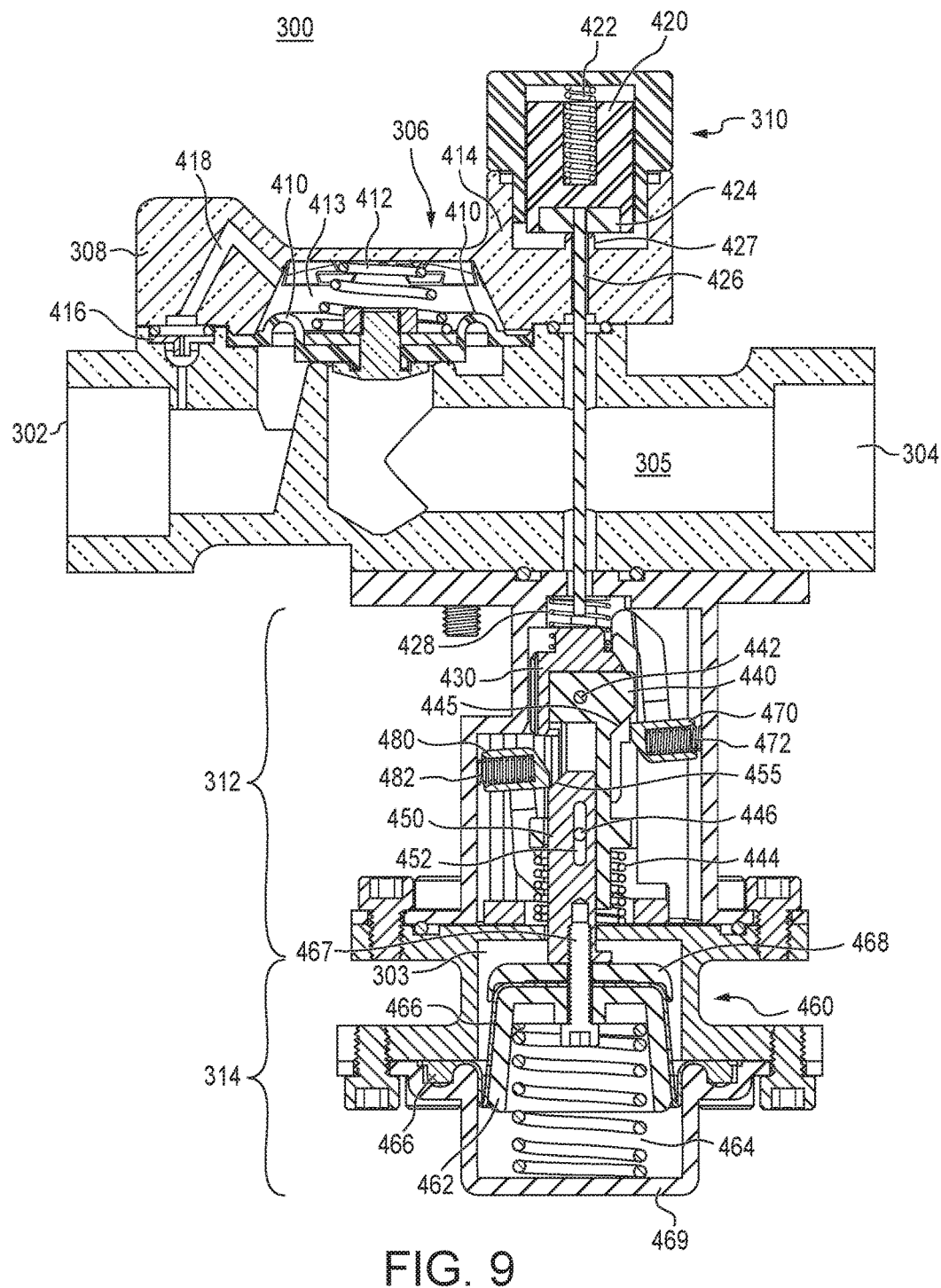
Figure 10:
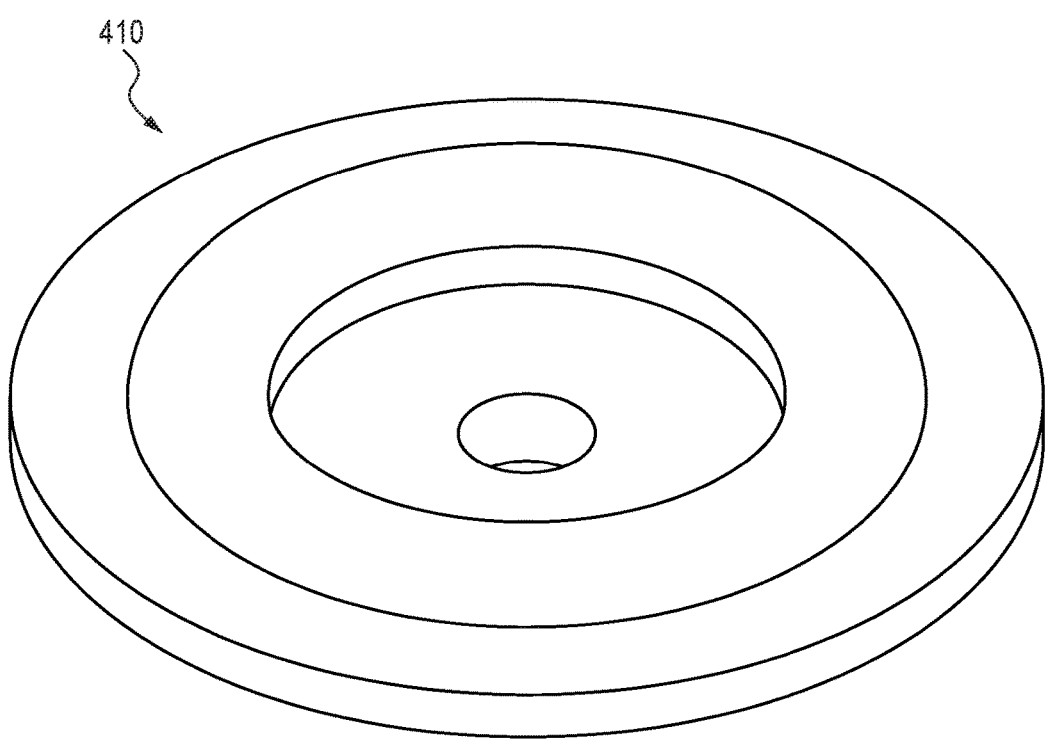
FIGS. 10-19 are perspective views of various components of the valve assembly of FIGS. 3-9.
Figure 11:
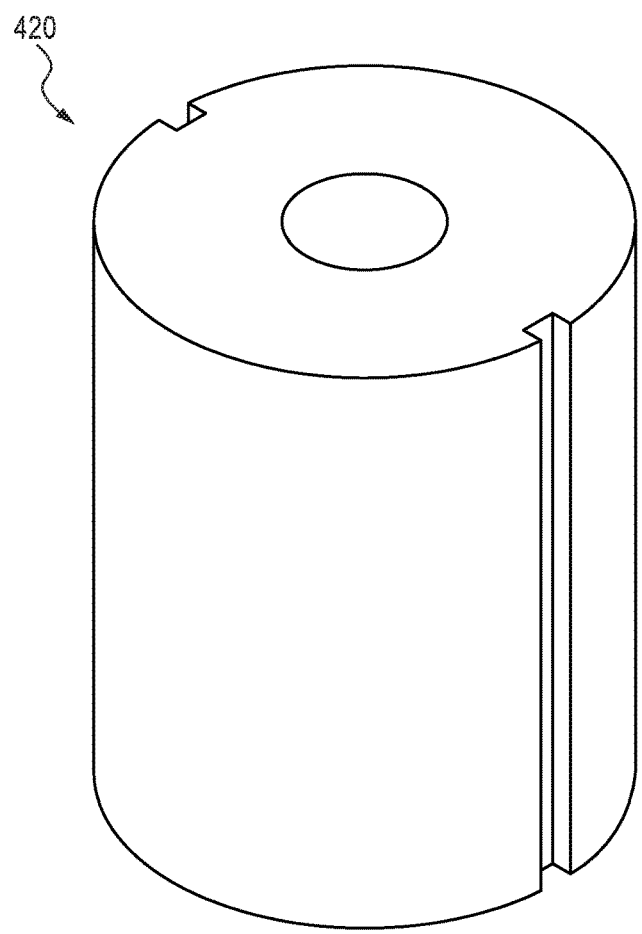
Figure 12:
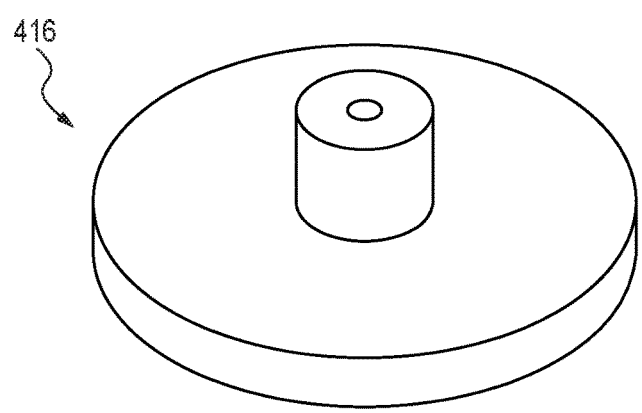

Various states of operation of the valve assembly will now be described with reference to FIGS. 4-9. In general, FIG. 4 depicts "State 1," which is an initial filling state; FIG. 5 depicts "State 2," which is an intermediate filling state; and FIG. 6 depicts "State 3," which is the end of the filling state. As illustrated, each of States 1-3 involve the pilot slide 430 and pilot actuation pin 426 in the latched-up position, causing the pilot valve 310 to be open. FIG. 7 depicts "State 4," which is the end of the filling state, in which the pilot valve is closed; FIG. 8 depicts "State 5," which is an intermediate leakage state; and FIG. 9 depicts "State 6," which is leakage state, which proceeds the initial refilling state depicted in FIG. 4. As illustrated, each of States 4-6 involve the pilot slide 430 and pilot actuation pin 426 in the latched down position, causing the pilot valve 310 to be closed.

In FIG. 4—State 1, the main valve 306 is open, in a relaxed state, with compliant chamber 303 unpressurized. As such, the piston 462 is raised, under force of the diaphragm spring 464, causing the diaphragm slide 450 and, in turn the middle slide 440 and pilot slide 430 to be raised, thus opening the pilot valve 310. Additionally, valve close latch 470 is about to be engaged with a corresponding retention surface (435 in FIG. 13) of the pilot slide 430, whereas valve open latch 480 is not engaged with its corresponding retention surface (449, shown in FIG. 14) on the middle slide 440.

State 2 of FIG. 5 is similar to State 1 of FIG. 4 in that main valve 306 continues to be open. However, middle slide 440 has moved downward by virtue of increased pressure in the compliant chamber 303 and on piston 314 from filling, and while valve close latch 470 has not yet been disengaged by virtue of middle slide 440 moving downward, valve open latch 480 has been engaged with the corresponding retention surface on middle slide 440; both latches 470, 480 are engaged. As the system fills, middle slide 440 moves downward relative to pilot slide 430 as diaphragm slide 450 and piston 462 similarly move downward, as diaphragm spring 464 is compressed under increasing pressure from filling.

State 3—the end of fill state, shown in FIG. 6—is similar to State 2, with each of the middle slide 440, diaphragm slide 450, and piston 462 having moved further down. Moreover, the valve close latch 470 has been disengaged (or released) by virtue of disengagement surface 445 forcing it away and causing it to pivot from engagement surface 435 on pilot slide 430. As will be understood by those skilled in the art, valve close latch 470 will have been disengaged when the pressure in compliant chamber 303 increased to (or about) a preconfigured "shut-off" pressure corresponding to piston 462 (and thus diaphragm slide 450 and middle slide 440) having moved downward sufficiently to disengage valve close latch 470. With valve close latch 470 disengaged, pilot slide 430 can move downward, thus permitting closing of pilot valve 310 and main valve 306. As such, between States 3 and 4, the main valve 306 shuts off.

In State 4—the filled state shown in FIG. 7—the system is pressurized (e.g., compliant chamber 303 is at or near the inlet pressure). Thus under pressure, the piston 314 is compressed, which draws diaphragm slide 450 downward, bringing with it middle slide 440. Consequently, the valve close latch 470 is disengaged (pivoting about axis A-A in FIG. 16), compressing spring 472, such that pilot slide 430 may move downward (and downward relative to the middle slide 440), permitting pilot valve 310 to be closed. With pilot valve 310 closed, main valve 306 is also closed.

Turning now to FIG. 8, an illustrative intermediate leakage State 5 will be discussed. As shown, with leakage occurring and a resultant pressure drop, diaphragm slide 450 begins to move upward, allowing middle slide 440 to do the same under force of middle slide spring 444 (and by virtue of the slides being coupled via pin 446 and slot 452). Middle slide 440 continues to move upward as leakage continues, until valve open latch 480 engages valve open latch retention surface of middle slide 440, as shown in FIG. 8.

FIG. 9 illustrates a further leakage State 6. With leakage (even extremely slow leakage) continuing, the pressure will continue to drop, and as a result, diaphragm slide 450 will continue to move upward. Middle slide 440 cannot continue to move upward because (as noted with regard to FIG. 8) valve open latch 480 has been engaged. However, as diaphragm slide 450 continues to move upward, disengagement surface 455 will contact valve open latch 480 (as shown in FIG. 9) and eventually disengage valve open latch 480, thus releasing middle slide 440. As will be understood by those of skill in the art, valve open latch 480 will have been disengaged when the pressure in the compliant chamber 303 decreases to (or about) a preconfigured "fill" pressure corresponding to piston 462 (and thus diaphragm slide 450) moving upward to the point at which valve open latch 480 is disengaged by diaphragm slide 450. When released, middle slide spring 444 (which is much stronger than pilot slide spring 428) forces middle slide 440 upward, which, in turn, forces pilot slide 430 upward, opening it. As a result, the pressure in the main valve back chamber 413 drops and main valve 306 is opened. As such, even a slow leak has resulted in (or been converted by the valve assembly 300 to) a measurable flow. The valve assembly 300 will thus be returned to State 1 of FIG. 4.

As will be appreciated by those skilled in the art based on the present description, the present embodiment has various advantages. In operation, the valve assembly 300 has discrete states of operation, including, in the present embodiment, depending on the states of the valve close latch 470 and valve open latch 480, and thus avoids oscillation or chatter. In other words, although the valve assembly 300 is responsive to even slow leaks and gradual changes in pressure (e.g., by virtue of gradual movement of piston 460), the pilot valve 310 and main valve 306 operate in binary states—opened or closed—with no intermediate state (e.g., partially opened) and toggle between those states preferably at preconfigured "shut off" and "fill" pressures. The gradual changes in pressure and movement of the piston 460 are translated into discrete movement opening or closing pilot valve 310 and main valve 306. When valve close latch 470 is released (between States 3 and 4), pilot slide spring 428 forces pilot slide 430 downward and, by virtue of coupling by the pilot actuation pin 426, pilot valve 310 closes and main valve 306 closes. When valve open latch 480 is disengaged (as discussed in connection with FIG. 9), middle slide 440 is released and forced upward, which opens pilot valve 310. This occurs, in part, because the middle slide spring 444 has a relatively greater force than the pilot spring 428 (for example, about two times greater, although other relative strengths, more or less, are within the scope of the present invention).

As will further be appreciated by those of skill in the art based on the present description, the placement of and distance between the retention surfaces contributes to the operation of the valve assembly. More specifically, these (along with the diameter of the diaphragm, and the forces (k factors) of the springs chosen) effect the threshold pressures at which the pilot valve latches and unlatches, and thus, at which the main valve opens and closes.

In a preferred embodiment, the valve assembly 300 is tuned such that it shuts off at or about the lowest expected inlet pressure (e.g., about 40 psi in the United States). Shutting off at as lower pressure could risk under powering the toilet 110. To achieve this, the piston 462, and more specifically, the force of diaphragm spring 464, is appropriately selected to be fully or almost fully compressed when the complaint chamber 303 is at or near inlet pressure (e.g., 40 psi). For example, with a 1" diaphragm, and the valve close latch retain surface 435 placed such that it requires 0.215" of travel in piston 462 from an unpressurized state to where it releases the latch, a 1.25" free length spring with a K factor of 8.2 will set the valve close pressure to be about 40 psi. Many other spring free lengths and K factors could be chosen that would set the valve close pressure to be 40 psi, as long as the diaphragm size and placement of latch retention surfaces change accordingly, as will be appreciated by those skilled in the art.

An alternate embodiment of a valve assembly will now be described with reference to FIGS. 20-26. Valve assembly 500 includes a main valve (not shown), pilot valve 510 and flow restrictor (not shown), as with the embodiment of FIGS. 3-19. Assembly valve 500 also has outlet 504 for connection to the device (e.g., toilet 110), and an inlet 502 for connection to a water source (in certain embodiments with generator/turbine disposed therebetween). The main valve, flow restrictor and inlet are not shown in FIGS. 21-26 because the valve assembly 500 is illustrated rotated 90 degrees from the view of FIGS. 4-9. As with the prior embodiment of FIGS. 3-19, pilot valve 510 includes a pilot plunger spring 522, a pilot plunger 520, a pilot plunger seal 524 and a pilot actuation pin 526 and operates similarly.

Valve assembly 500 also includes piston 514, which acts as a pressure sensor and has the same general configuration as piston 462. As such, piston 514 includes piston 562 against which diaphragm spring 564 exerts force. The diaphragm spring 464 is retained within the piston housing by virtue of diaphragm spring retaining cap 569. Sealing the piston and defining a compliant chamber 303 is rolling diaphragm 566, which resides between piston 562 and piston cap 568. As illustrated, unlike the embodiment of FIGS. 3-19, piston 514 is inverted, and not in axial alignment with the pilot valve 510 or pilot actuation pin 526. Water enters compliant chamber 503 by traveling through main flow channel, through the chamber that the switch plate 540 and frame 530 are housed in, and finally through a gap between, or channel in either, frame post 537 and the hole in housing 550 that frame post 537 passes through.

The latch assembly 512 is relatively simpler than that the prior embodiment, though does provide similar advantages by virtue of having discrete states of operation, as will be apparent from the following description. Latch assembly 512 generally includes frame 530 (shown in greater detail in FIG. 26) and switch plate 540 (shown in greater detail in FIG. 25). In general, frame 530 is coupled to piston 514 (via screw 567, which is received in a threaded opening 531 of frame 530), such that frame 530 is movable in response to movement of piston 514. As will be readily apparent from the Figures, frame 530 moves along the axis of piston 514.

Frame 530 of the present embodiment generally comprises a linear portion 537, in axial alignment with piston 514, and a C-shaped portion 539, which includes arms 532, 534, which are generally orthogonal to the linear portion 537. As such, arms 532, 534 (in conjunction with latch housing 550) serve to limit the axial movement of frame 530. In alternate embodiments, other configurations of frame 530 may be used. As with other components, the geometry of the frame may be different in different embodiments, for example other geometries that allow for linear motion in a direction roughly perpendicular to the orientation of the mounted switch plate 540.

Figure 23:
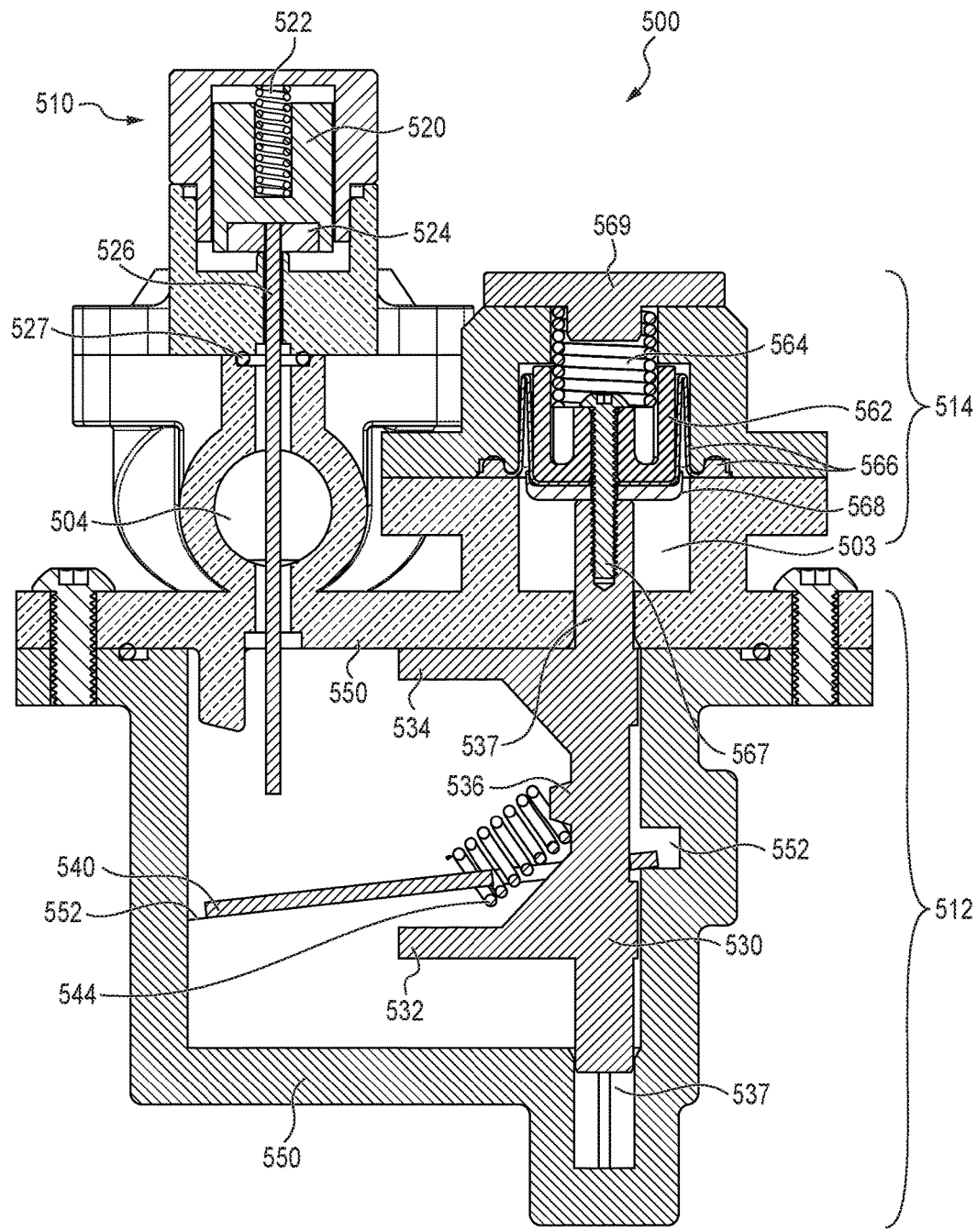

More specifically, frame 530 is movable between a first position, in which frame arm 532 abuts latch assembly housing 550, and a second position, in which frame arm 534 abuts latch assembly housing 550. As described in detail below, the first (open) position corresponds to piston valve 510 being in an open state, in the second position corresponds to piston valve 510 being in a closed state. Furthermore, the first position corresponds to switch plate 540 being in a raised position, in contact with pilot actuation pin 526, and the second (closed) position corresponds to switch plate 540 being in a lowered position, not in contact (spaced away from) pilot actuation pin 526. In certain embodiments, latch housing 550 includes a shelf 552 for receiving switch plate 540 and thus limiting movement of the switch plate 540 and defining its lowered position, though in alternate embodiments other structures may be used. The first position is shown in FIG. 21, and the second position is shown in FIG. 23.

Figure 25:
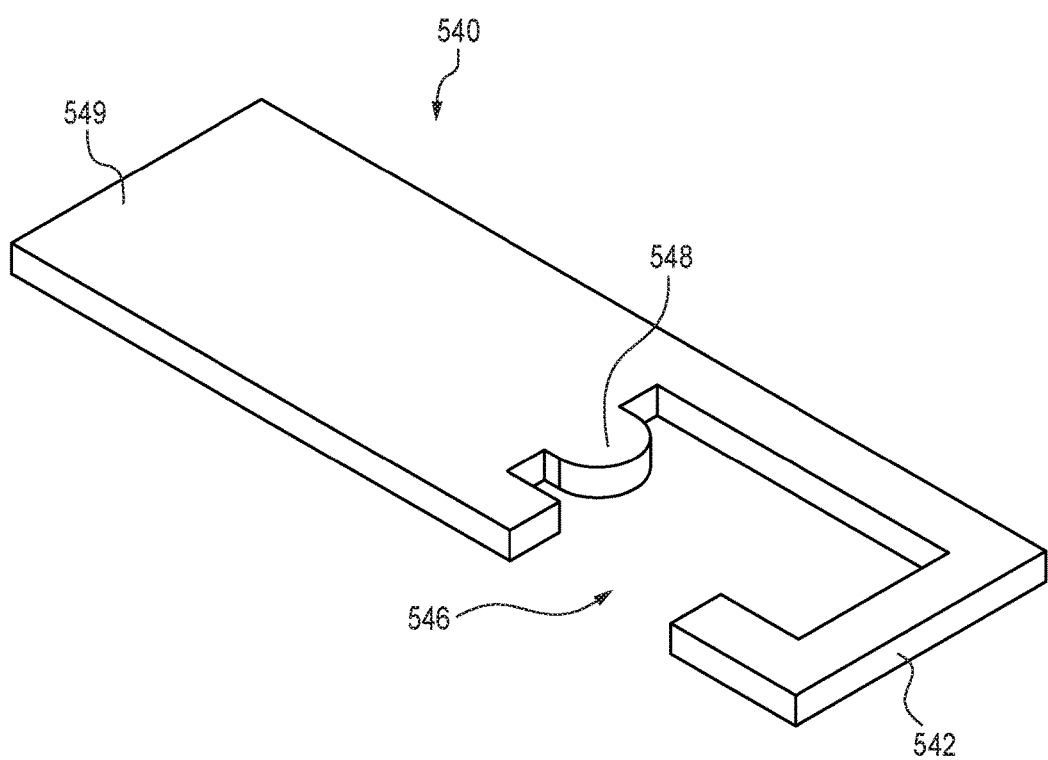
FIGS. 25 and 26 are perspective views of various components of the valve assembly of FIGS. 20-24.
Figure 26:
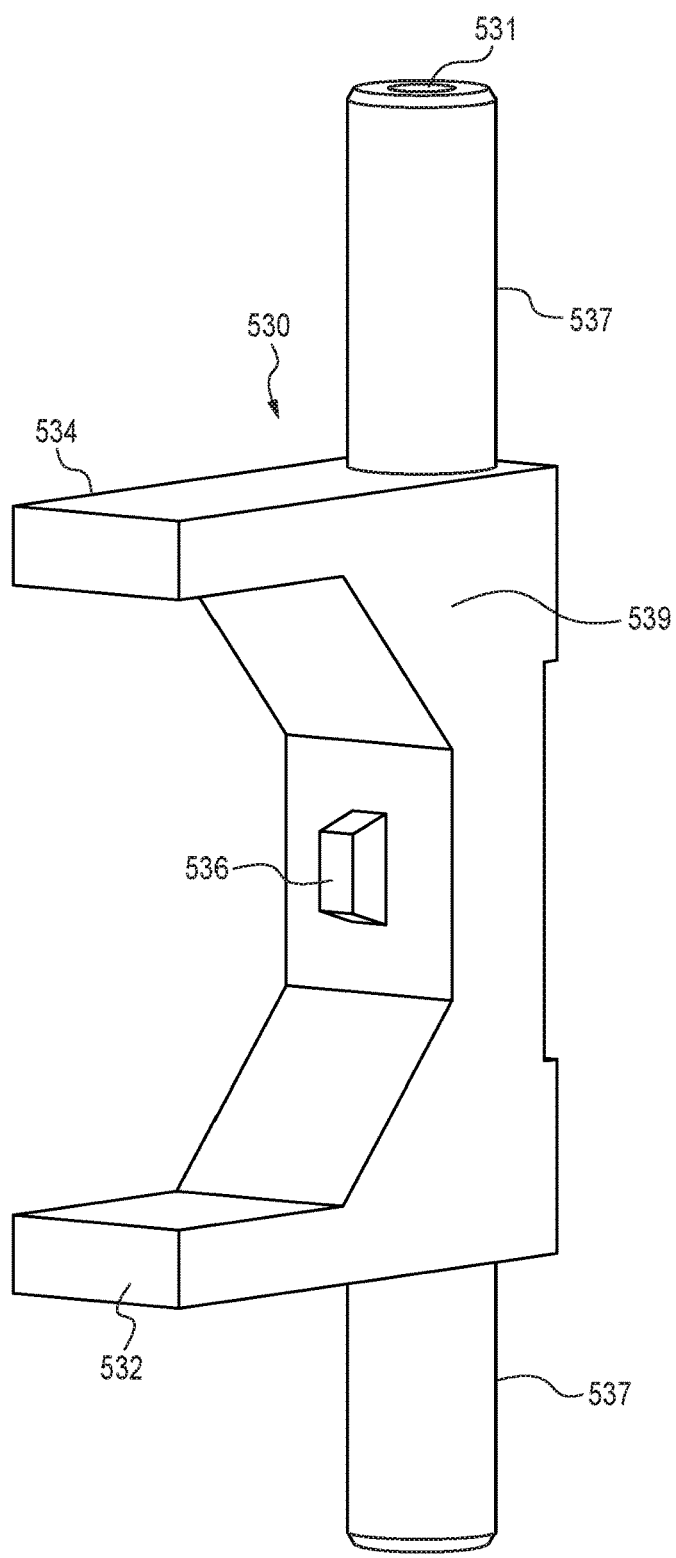

As shown in FIG. 25, switch plate 540 includes first end 542, which is received within a recess 552 of latch assembly housing 550, and an opening 546, which receives frame 530. In essence, switch plate 540 is hooked around frame 530. Furthermore, switch plate projection 548, which extends within the opening 546, is dimensioned to receive one end of switch plate spring 544, the other end being received by projection 536 of frame 530. As will be appreciated, frame spring 544 assists in the movement of switch plate 540 between its two positions. Switch plate 540 further includes, at the second end, opposite the opening 546, surface 549 for contacting pilot actuation pin 526. In alternate embodiments, the switch plate may take different forms, including passing through an opening in the frame.

Figure 24:
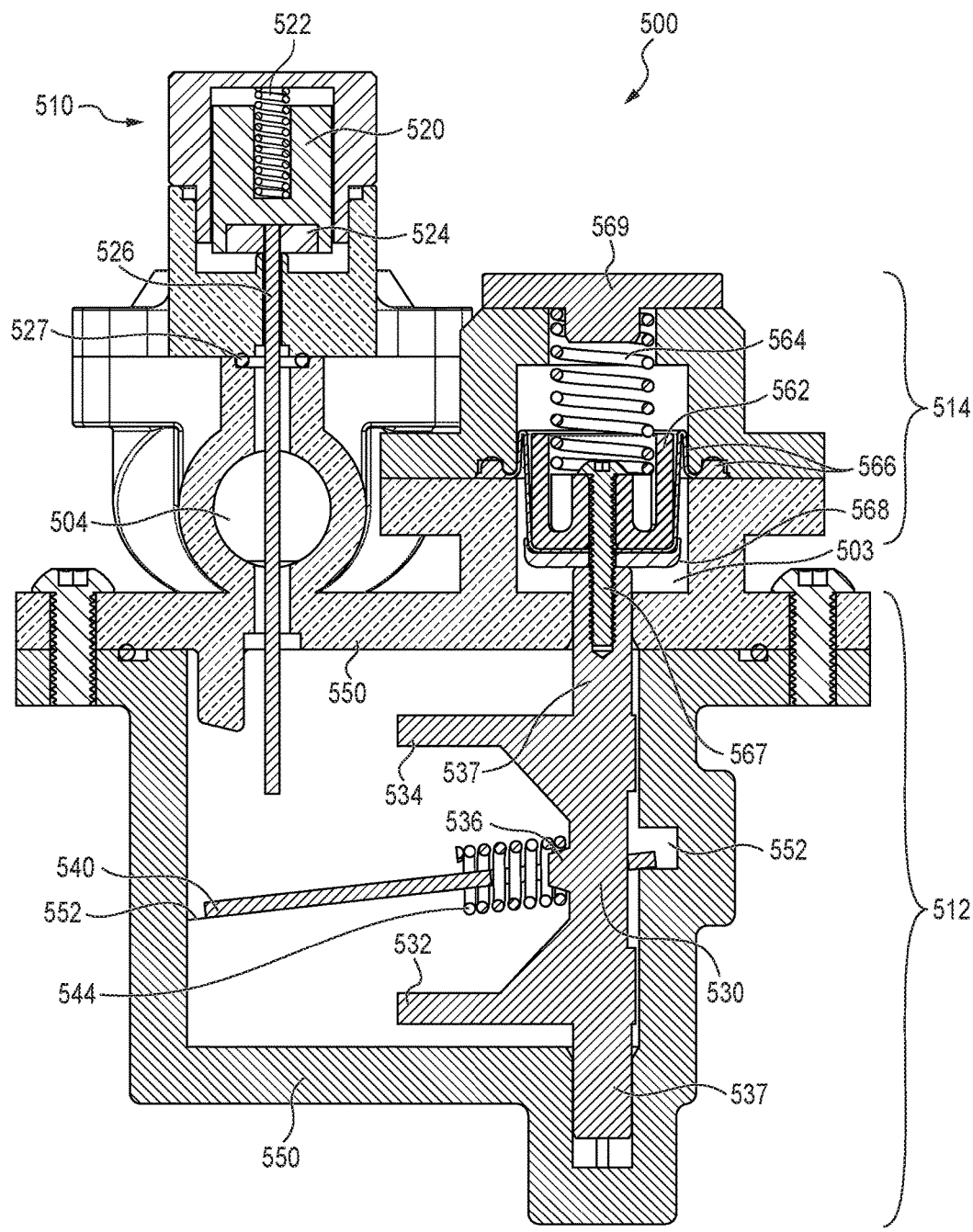

Operation of valve assembly 500 will now be described with reference to four states of operation. FIG. 21 illustrates State 1, in which pilot valve 510 is not pressurized and is open. FIG. 22 illustrates State 2, which is an intermediate filling state. FIG. 23 illustrates State 3, which is a filled state, in which pilot valve 510 is pressurized and is closed. FIG. 24 illustrates State 4, which is an intermediate leakage state. Each of these Figures and States will now be described in greater detail.

Figure 21:
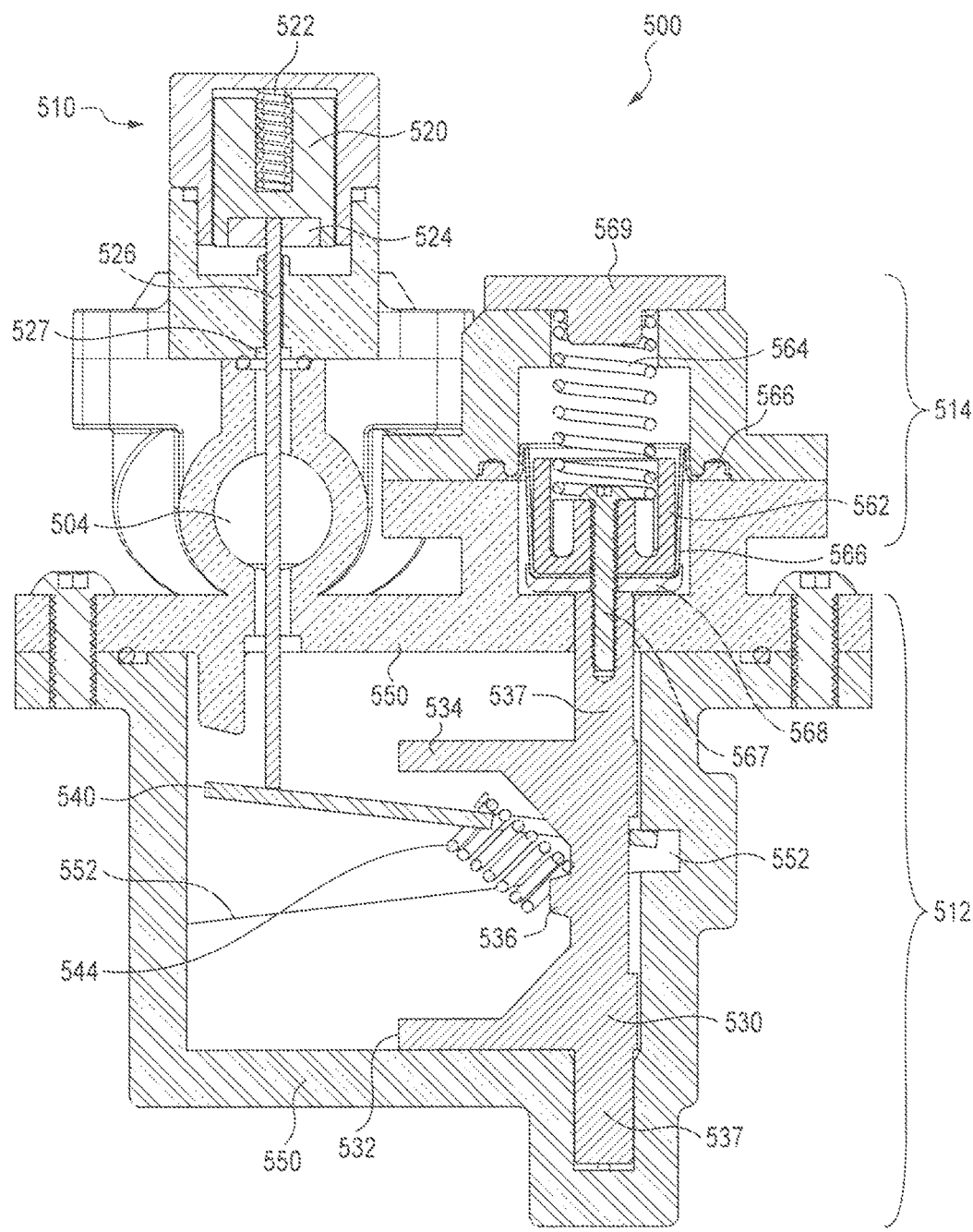
FIGS. 21-24 are cross sectional views of the valve assembly of FIG. 20 in various states of operation.
Figure 22:
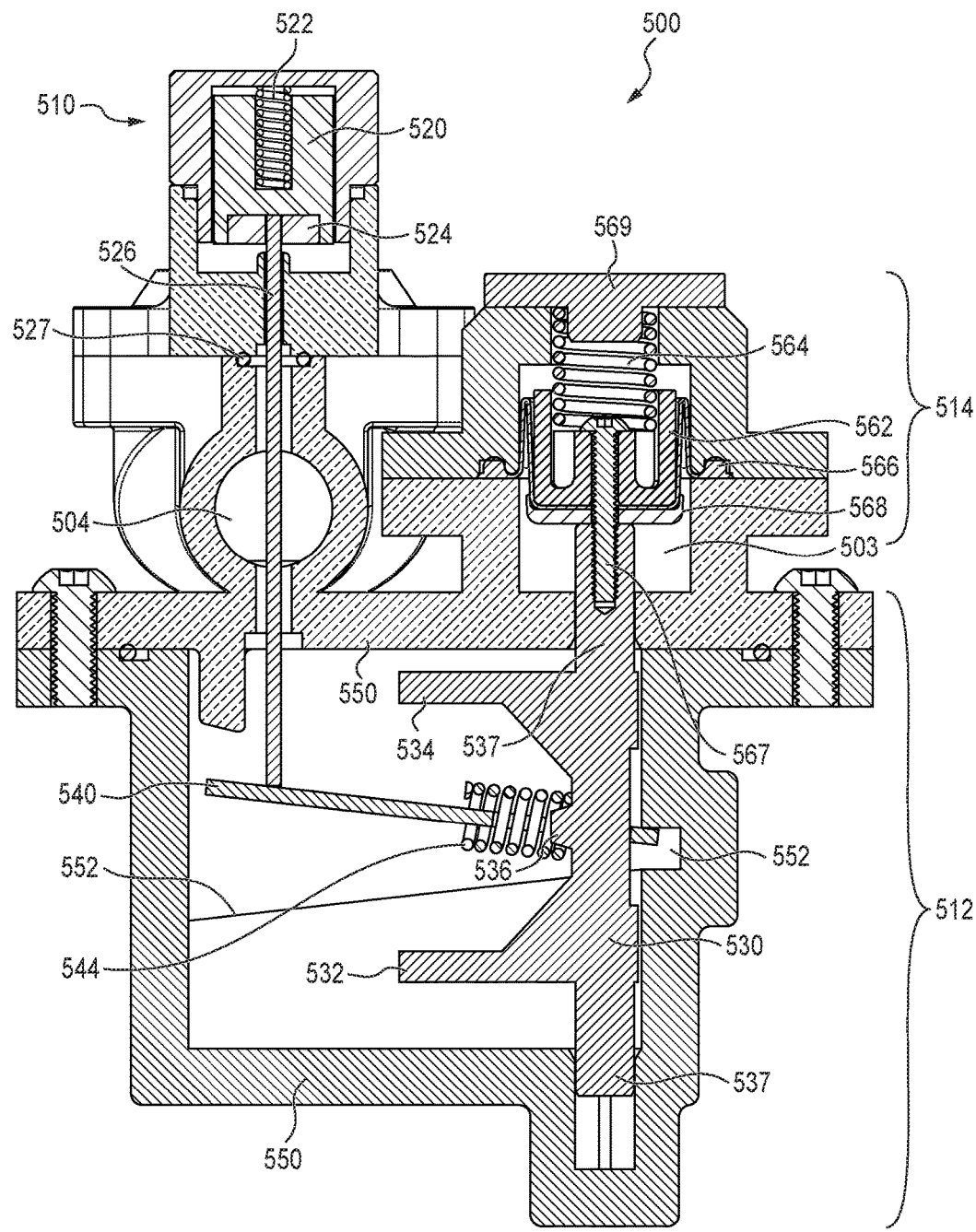

Turning to FIG. 21, State 1 is characterized in that pilot valve 510 and the main valve 508 are in open or relaxed (not pressurized) state, for example when the valve assembly 500 is first connected to the fluid supply and not pressurized. With the system (and compliant chamber 503) not being pressurized, piston 514 is fully extended under the force of diaphragm spring 564. As such, frame 530 is in its first position, in which arm 532 abuts latch housing 550, and switch plate 540 is urged fully upward, such that surface 549 abuts the pilot actuation pin 526, forcing pilot valve 510 open.

FIG. 22 illustrates State 2, which is an intermediate filling state. As such, as the system begins to pressurize, piston 513 is no longer fully extended, as the pressure in the system (and compliant chamber 503) exerts on the piston 514, compressing diaphragm spring 564. As the piston 514 moves, it draws with it frame 530. Accordingly, as illustrated, frame 530 is an intermediate position, in which arm 532 (like arm 534) is not abutting latch housing by 50. Furthermore, as shown, despite frame 530 being moved out of its first position, into an intermediate position, switch plate 540 remains in contact with pilot actuation pin 526, whose position has not yet changed. Pilot valve 510 (and the main valve 508) thus remains open.

FIG. 23 illustrates State 3, which represents a filled or fully pressurized state, characterized in that the pilot valve 510 is now closed (as is the main valve 508). More specifically, as the system fills and becomes fully pressurized (e.g., at or near the inlet pressure) piston 540 becomes fully compressed thus drawing frame 530 into its second position, namely, where arm 534 abuts latch housing 550 and switch plate 540 toggles to its downward position, spaced away from pilot actuation pin 526. As will be appreciated by those skilled in the art, given the configuration of the frame 530, switch plate 540, spring 544 and groove 552, switch plate 540 does not gradually move into its downward position, but rather relatively quickly springs or toggles into place (similar to pilot slide 430 forcible moving downward once valve close latch 470 is disengaged, as described with reference to FIG. 7). As will be understood, switch plate 540 toggles from the valve open position to its valve closed position when the pressure in the compliant chamber 503 increases to be at or about a configured "shut-off" pressure (analogous to the prior embodiment).

FIG. 24 illustrates State 4, which is an intermediate leakage state. As leakage occurs and the downstream device, such as toilet 10, the system (and compliant chamber 503) begins to depressurize, which results in piston 514 expanding under force of the diaphragm spring 564. As such, frame 530 gradually moves out of its second position, such that arm 534 is no longer abutting latch housing 550. Despite frame 530 so moving, switch plate 540 does not immediately move out of its downward position.

Instead, switch plate 540 only toggles to its upward position (in which it exerts force on pilot actuation pin 526, thus opening pilot valve 510) once piston 514 and thus frame 530 move beyond a certain threshold, towards the second position of frame 530. This threshold corresponds to the aggregate leakage reaching a threshold change in volume or pressure in the compliant chamber 503. In other words, as a leakage continues pressure continues to decrease, thus permitting piston 514 and frame 530 to gradually move, until switch plate 540 forcibly toggles to its upward position, thus opening pilot valve 510. In other words, switch plate 540 toggles from its closed position to its open position when the pressure in the compliant chamber 503 decreases to at or about a configured "fill" pressure. As the switch plate 540 toggles to its upward position, the valve assembly 500 will then move to State 1 (i.e., with frame 530 is in its first position).

Thus, like the other embodiments disclosed herein, the valve assembly 500 has discrete states of operation, including, in the present embodiment, depending on the first and second positions of switch plate 540 (and thus pilot valve 510 and the main valve), and thus avoids oscillation or chatter. In other words, although the valve assembly 500 is responsive to even slow leaks and gradual changes in pressure (e.g., by virtue of gradual movement of piston 514 and frame 530), the switch plate 540 and thus pilot valve 310 and main valve 306 operate in binary states—opened or closed—with no intermediate state. The gradual changes in pressure and movement of the piston 514 are translated into discrete movement opening or closing pilot valve 510 and the main valve 508.

Figure 27:
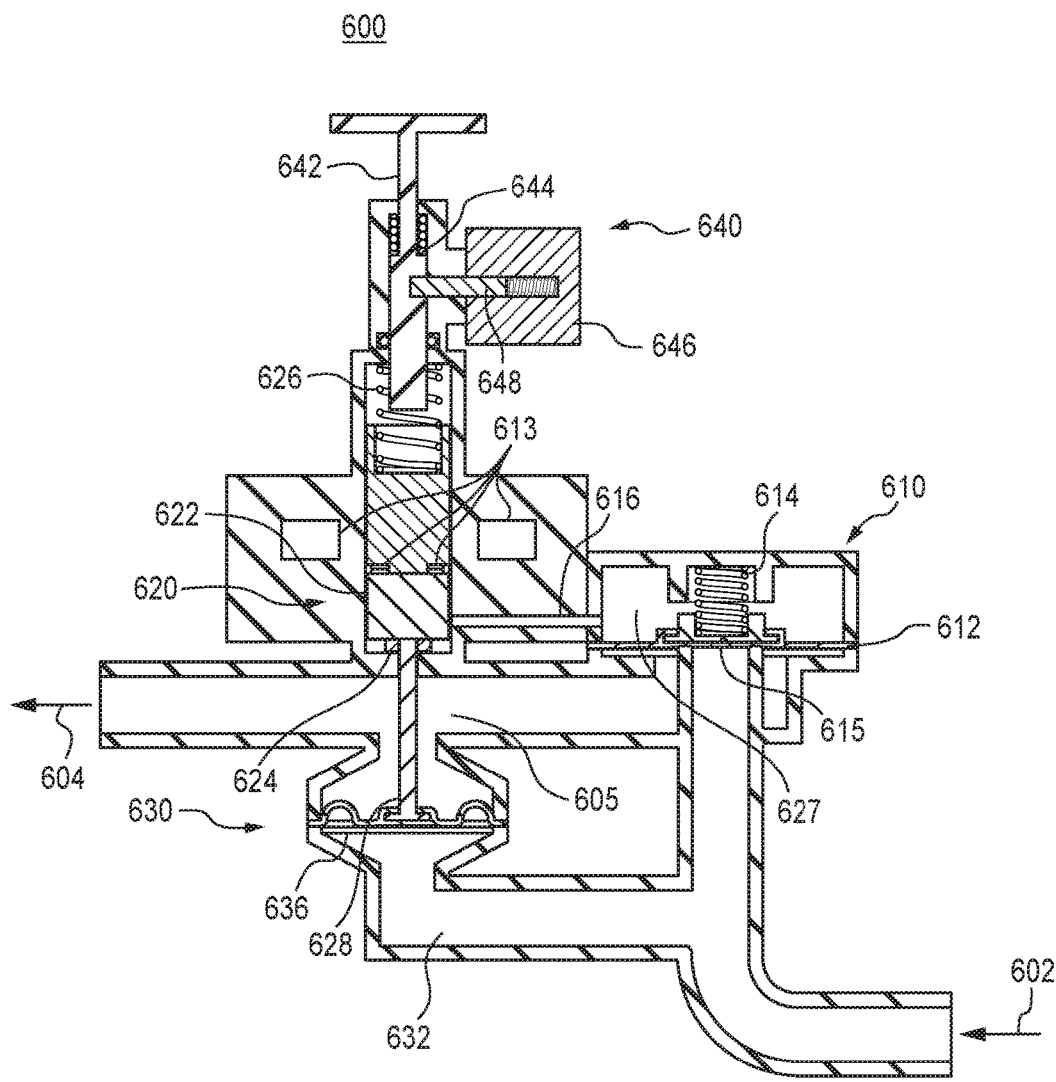
FIGS. 27 and 28 are cross sectional views of a valve assembly according to an alternate embodiment of the present invention.
Figure 28:
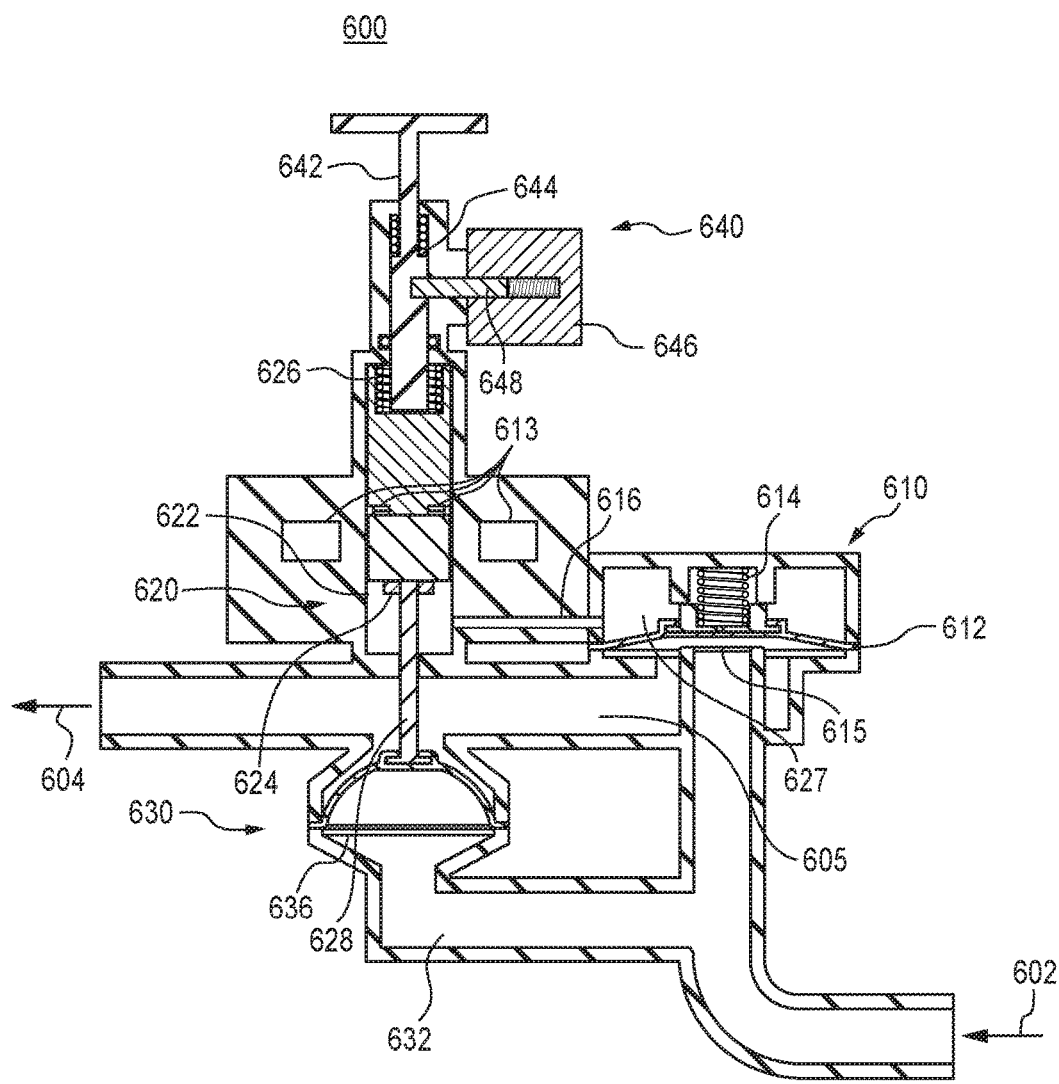

FIGS. 27 and 28 illustrate a valve assembly 600 according to another embodiment, having an inlet 602, to be connected to a fluid (e.g., water) supply (which may include a generator/turbine disposed between the valve assembly 600 and the supply, as described above), and outlet 604, to be connected to the monitored device (e.g., toilet 110). The valve assembly 600 includes a main valve 610, similar to those described above, comprises a main valve diaphragm 612 main valve spring 614. The main valve 610 is located between the inlet 602 and the outlet 604; when main valve 610 is open, flow is permitted from the inlet 602 to the outlet 604, and when closed, such flow is restricted.

Valve assembly 600 also includes pilot valve 620. Pilot valve 620 includes pilot plunger 622 connected to pilot seal 624, pilot spring 626, which urges the pilot valve 620 downward, into a closed position, and pilot actuation pin 628. As with prior embodiments, the pilot valve 620 is in fluid communication with the main valve 610, here via bleed port or channel 616.

Pilot valve 620 also includes magnetic (or in alternate embodiments, mechanical, such as spring loaded ball detents, or electromechanical) detents 613, which include magnets affixed to the pilot plunger 622, as well as external magnets, the operation of which are described in greater detail below.

Also similar to prior embodiments, the pilot actuation pin 628 passes through a nipple or seal through compliant chamber 605. Pilot actuation pin 628 continues through the compliant chamber 605 and his affixed to a pressure sense valve 630.

Pressure sense seal 630 generally includes pressure sense diaphragm 636. It is in fluid communication with compliant chamber 605 and is interposed between compliant chamber 605 and inlet 602, via chamber 632. As such, the pressure sense valve 630 is operative in response to a pressure differentials between the inlet 602 (and chamber 632) and the compliant chamber 605.

Valve assembly 600 further includes a shut off assembly 640, which is generally used to forcibly close pilot valve 620 and thus close main valve 610, thereby shutting off the main flow of water from the inlet 602 to the outlet 604. Shut off assembly 640 includes a shut off plunger 642, which is in axial alignment with an contacting pilot plunger 622 and is urged downward by shut off spring 644. Movement of a shut off plunger 642 is controlled (e.g., permitted or restricted) by shut off solenoid 646 and associated shut off solenoid arm 648. In the present embodiment, the shut off plunger 642 is maintained in an upward state, with shut off spring 644 compressed, by shut off solenoid 646 and arm 648 until such time as shut off solenoid 646 receives a shut-off signal (e.g., from the microprocessor assembly) indicating, for example, a leak condition (e.g., as indicated by the current from the generator/turbine), causing the shut off plunger 642 to be released.

To summarize, main valve 610 and its rubber diaphragm 612 is capable of sealing off inlet pressure when pilot valve 620 (and pilot chamber 627) is fully pressurized. The pilot chamber 627 (which can also be thought of as the main valve back chamber) becomes pressurized through the relatively small (cross section) bleed port, which is a small hole 615 in the center of diaphragm 612. The pilot valve 620, which opens and closes a path to valve assembly outlet 604 to drain the pilot chamber 627 of main valve 610. This path has a larger cross sectional area than the bleed port 615, so that the pilot chamber 627 does not become pressurized while the pilot valve 620 is opened. Pilot valve 620 is mechanically coupled to a pressure sense diaphragm 510 via pilot actuation pin 628 and a series of magnetic (or, in alternate embodiments, mechanical) detents 613. One side of the pressure sense diaphragm 630 is exposed to inlet pressure, and the other to outlet pressure.

In operation, when pressures on both sides of the sensing diaphragm 630 are about equal (e.g., at or about the inlet pressure), the pilot valve 620 is closed. When pilot valve 620 is closed, pilot chamber 627 is pressurized through the bleed port 616 and main valve 610 is closed. As pressure decreases due to an even very small leak in the toilet 110 (or other device), the compliant chamber 605 loses volume (pressure reduces) until a critical point (a fill pressure, which may be at or about atmospheric pressure) where the dimensional collapse of (reduction of pressure in) the chamber causes pressure sense diaphragm 636 or to expand or raise in response to the relatively greater pressure in chamber 632 as compared to compliant chamber 605, thereby opening pilot valve 620 and main valve 610. In the present embodiment, such critical point is a predetermined pressure loss or differential, defined in part by the force of pilot spring 626 and consistent with the above embodiments.

Following even a slow leak, once the pressure drops such that pressure sense valve 630 overcomes the force of pilot spring 626, pilot valve 620 is opened to initiate a refilling event, recharging the compliant chamber 605, which refill flow can be detected by the generator/turbine which is read by the embedded processor. Thus, valve assembly 600 (like valve assemblies 400 and 500) are capable of detecting very low leak by the low flow detection valve assembly whereby two valves are operating in hydraulic communication with each other.

FIG. 27 illustrates valve assembly 600 in a closed position. The main valve 610 has a very small orifice 615 in the center of diaphragm 612 through which water flows until the pressure on each side of main valve 610 is about the same. Main valve spring 614 supplies sufficient pressure to then close main valve 610 so that no flow occurs therethrough (i.e., from inlet 602 to outlet 604).

When a low flow leak occurs downstream of the valve assembly 600, pressure decreases on the outlet pressure side (the compliant chamber 605) of the sense diaphragm 630. Pilot valve 620 does not immediately open, however, as detent 613 prevents pilot valve 620 and sense diaphragm 630 motion when the force on the sense diaphragm 636 is below a configured threshold (e.g., corresponding to a fill pressure). Such threshold may be set based on the strength of the magnets utilized (or physical or electromechanical detents in alternate embodiments). In operation, the inner magnets of the detent 613 "jump" or toggle from a position on one side of the outer magnets to the other side.

As illustrated in FIG. 28, when the pressure in the compliant chamber 627 drops below a configured threshold, the sense diaphragm 636 expands under the relatively greater inlet pressure, moving the pilot actuation pin 628, which causes pilot valve 620 to suddenly move past the detent 613, opening pilot valve 620. This allows the pilot chamber 627 to drain, which reduces pressure in, and opens main valve 610. As the pressure at the outlet 604 of the valve assembly 500 increases due to the flow caused by the opening of the main valve 610, the pressure on the outlet pressure side of the sensing diaphragm 630 (and compliant chamber 605) increases, but the pressure sense diaphragm 636 (and thus pilot valve 620 via the coupling of the pilot actuation pin 628) is prevented from moving due to a second detent 613. When the pressure builds above a configured threshold set by the detent 613, the sensing diaphragm 636 and coupled pilot valve 620 suddenly close, sealing the bleed port 616 and closing main valve 610.

FIG. 28 illustrates pressure sense diaphragm 636 extended and therefore opening the pilot valve 620 and thus allowing main valve 610 back pressure to drop through the bleed port 616 and the open pilot valve 620. The inlet pressure of the main valve 610 thus is greater than, and overcomes the back pressure and force of main valve spring 614, thereby opening main valve 610.

As will be appreciated by those skilled in the art, the detents 613 may be configured such that the opening and closing of the pilot valve 620 occurs only after certain thresholds in changes in pressure of the compliant chamber 605 are met (or compliant chamber 605 pressure reaching the fill and shut-off threshold pressures), thus resulting in the valve assembly 600 operating in discrete states, as with the prior embodiments.

An alternative embodiment will now be described with reference to FIGS. 29 and 30. As will be appreciated by those skilled in the art, the valve assembly 700 of the present embodiment includes similar components as in the prior embodiment; however, in the present embodiment the mechanical coupling between the main valve and the pilot valve of the prior embodiment has been replaced with an electronic coupling. The movement of the pressure sensing diaphragm 730 may be sensed by means of a switch or a non-contacting method, such as a hall effect transducer 728 positioned adjacent a ferritic disc 734 coupled to the pressure sense diaphragm 736 via pressure sense arm 734. As the pressure sense diaphragm 736 expands or collapses, the ferritic disc 734 thus also moves, generating an electric signal via the hall effect sensor 728. This signal may be output from the sensor 728 to the embedded processor, which in turn can then generate an electronic signal sent to pilot actuation solenoid 722, which can open or close pilot valve 720.

Figure 29:
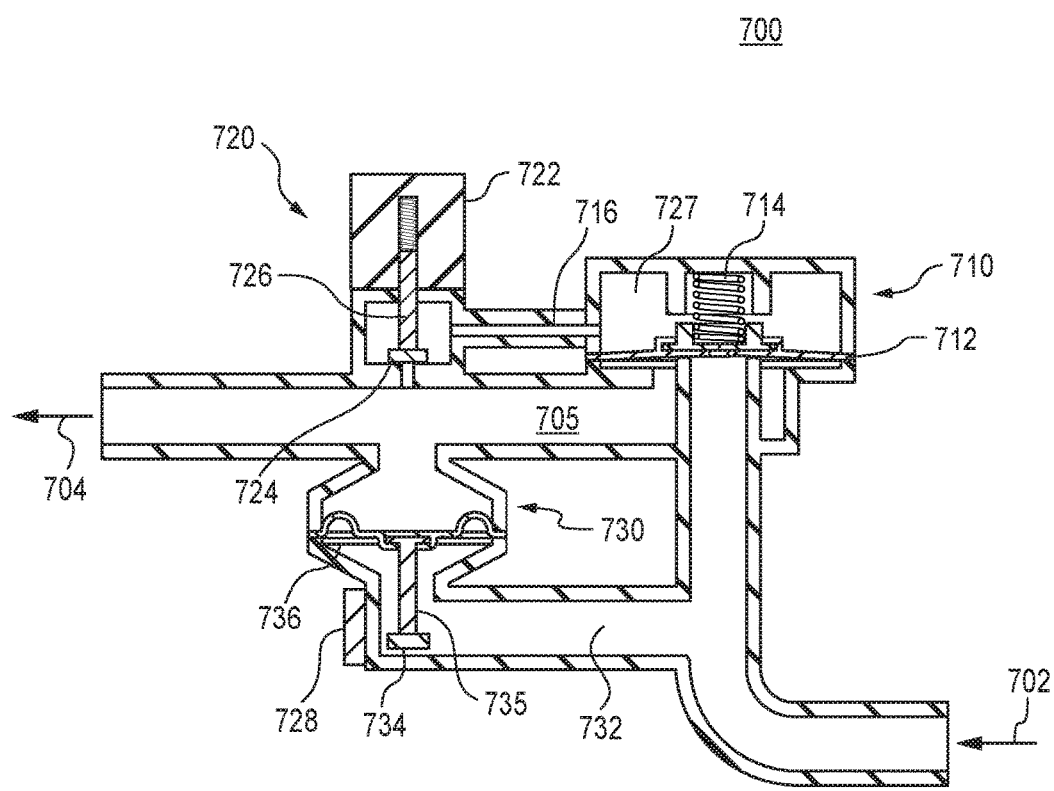
FIGS. 29 and 30 cross sectional views of a valve assembly according to another alternate embodiment of the present invention.

As shown in FIG. 29, a spring loaded pilot actuation plunger 726 rests in the closed position, allowing the main valve 710 to come to equilibrium (pilot chamber 727 to pressurize) due to the bleed port 716. Such pressure and the force of spring 714 of main valve 710 then closes the valve to water flow.

Figure 30:
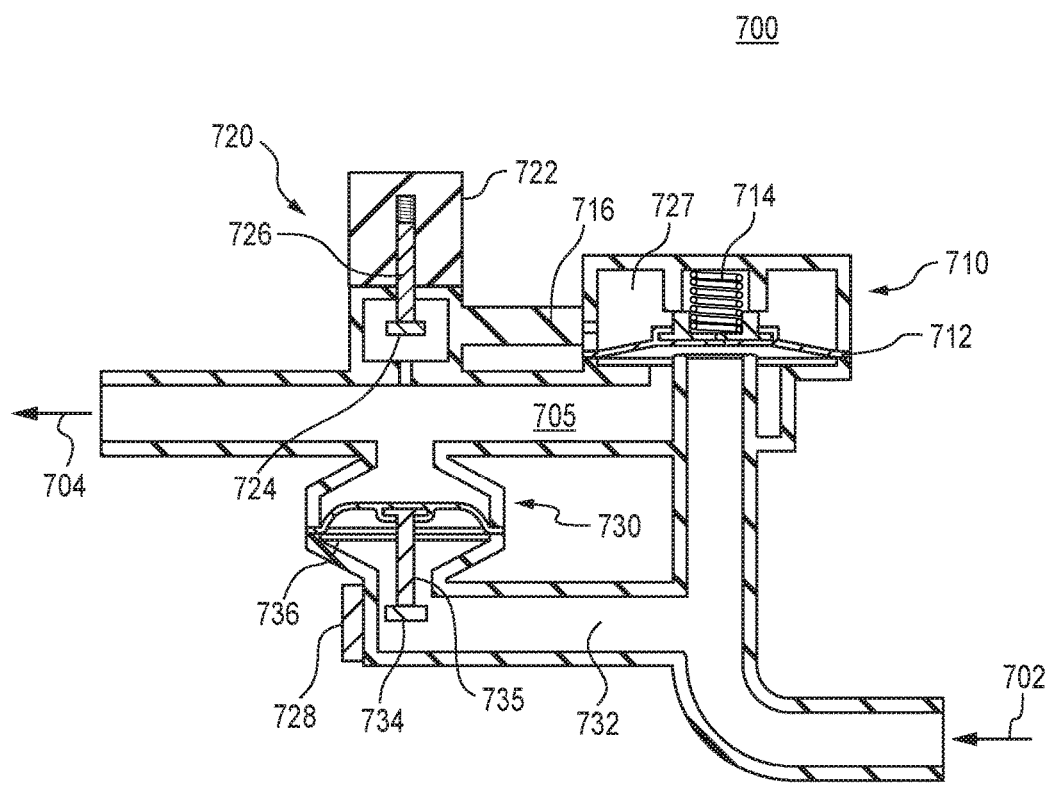

As shown in FIG. 30, when the pressure sense diaphragm 730 is displaced upward due to a drop in pressure in the compliant chamber 705 (such as from a slow leak or flush), the analog hall effect sensor 728 senses the movement of a ferritic disk 734, which generates an electrical signal sent to the embedded processor. The embedded processor then sends a signal (e.g., pulse) to the pilot actuation solenoid 722, causing it to open. In response, the back pressure behind the main valve 710 in chamber 727 drops and the main valve 710 opens. With the main valve 710 open, the compliant chamber 705 may become pressurized, pushing the pressure sense diaphragm 736 back to the lowered, filled position, once flow to the outlet pressure port stops. As will be appreciated by those skilled in the art, the sensor 728, disc 734 and/or processor may be configured such that the actuation signal sent to open or close the pilot solenoid 722 occurs only after certain thresholds in movement of the pressure sense diaphragm 736 (and thus thresholds in changes in pressure of the compliant chamber 705 to reach fill or shut-off pressure) are met, thus resulting in the valve assembly 700 operating in discrete states, as with the prior embodiments.

Those skilled in the art will recognize that the present invention has many applications, may be implemented in various manners and, as such is not to be limited by the foregoing embodiments and examples. Any number of the features of the different embodiments described herein may be combined into a single embodiment, the locations of particular elements can be altered and alternate embodiments having fewer than or more than all of the features herein described are possible. Similarly, it is to be understood, therefore, that this invention is not limited to the particular embodiments disclosed, but it is intended to cover modifications within the spirit and scope of the present invention, including the combination of features from different embodiments into a single embodiment and the replacement of one or more features in one embodiment with one or more featured from other embodiments. While there has been shown and described fundamental features of the invention as applied to being exemplary embodiments thereof, it will be understood that omissions and substitutions and changes in the form and details of the disclosed invention may be made by those skilled in the art without departing from the spirit of the invention. Moreover, the scope of the present invention covers conventionally known, future developed variations and modifications to the components described herein as would be understood by those skilled in the art.

What is claimed is:

1. A valve assembly for use between a fluid source, having an inlet pressure, and a valved device, the valve assembly comprising:
    an inlet, wherein the inlet is in fluid communication with the fluid source when the valve assembly is in use;
    an outlet, wherein the outlet is downstream of the inlet and is in fluid communication with the valved device when the valve assembly is in use;
    a main valve between the inlet and outlet, the main valve operating in either an open state or closed state;
    a pressure compliant chamber in fluid communication with the outlet, downstream of the main valve, the compliant chamber having a pressure when the valve assembly is in use;
    a pressure sensor in fluid communication with the compliant chamber, the pressure sensor gradually responsive to changes in pressure of the compliant chamber;
    a pilot valve in fluid communication with the main valve and responsive to the pressure sensor, the pilot valve operating in either an open state or closed state, wherein when the pilot valve is open, the main valve is open, thereby permitting flow of fluid from the inlet to the outlet, and when the pilot valve is closed, the main valve is closed, thereby preventing flow of fluid from the inlet to the outlet;
    the pilot valve being in the closed state when the compliant chamber is pressurized at or about the inlet pressure and remaining in the closed state until the pressure in the compliant chamber decreases to a fill pressure, less than the inlet pressure; and
    the pilot valve toggling from the closed state to the open state, thus opening the main valve, when the pressure in the compliant chamber decreases to at or about the fill pressure and remaining in the open state and transitioning from the open state to the closed state when the pressure in the compliant chamber increases to at or about a shut-off pressure;
    wherein the fill pressure is lower than the shut-off pressure.

2. The valve assembly of claim 1 wherein the shut-off pressure is at or about the inlet pressure.

3. The valve assembly of claim 1 wherein the fill pressure is at or about atmospheric pressure.

4. The valve assembly of claim 1 wherein the pressure sensor includes a piston, the valve assembly further comprising:
    a main flow channel between the inlet and outlet;
    a pilot actuation pin, a pilot slide, a middle slide, and a diaphragm slide, each in axial alignment with the pilot valve and moveable in the axial direction;
    a valve close latch; and
    a valve open latch;
    wherein:
    the pilot actuation pin extends through the main flow channel downstream of the main valve and is coupled to the pilot slide;
    the middle slide is moveable relative to the pilot slide;
    the diaphragm slide is coupled to the piston and moveable relative to the middle slide;
    the valve close latch is either (i) engaged with the pilot slide, in which the pilot slide and pilot actuation pin are in a first position and the main valve is open, or (ii) not engaged with the pilot slide, in which the pilot slide and pilot actuation pin are moveable to a second position and the main valve is closed;
    the valve close latch toggling from being engaged to being disengaged when the compliant chamber increases to at or about the shut-off pressure; and
    the valve open latch is either engaged with the middle slide, in which movement of the middle slide is restricted, or not engaged with the middle slide, in which movement of the middle slide is not restricted and the pilot slide and pilot actuation pin are free to toggle to the first position, thereby opening the main valve;
    the valve open latch toggling from being engaged to disengaged when the pressure in the compliant chamber decreases to at or about the fill pressure.

5. The valve assembly of claim 1 wherein the pressure sensor includes a piston, the valve assembly further comprising:
    a main flow channel between the inlet and outlet;
    a housing in fluid communication with the compliant chamber and the piston;
    a frame within the housing, the frame being gradually moveable in relation to pressure in the compliant chamber between a valve open position and a valve closed position;
    a pilot actuation pin coupled to the pilot valve and passing through the main flow channel and into the housing;
    a switch plate coupled to and responsive to movement of the frame, the switch plate toggling between a valve open position and a valve closed position, wherein in the valve open position, the switch plate is in contact with the pilot actuation pin and the pilot valve and main valve are open, and in the valve closed position, the switch plate is spaced away from the pilot actuation pin and the pilot valve and main valve are closed; and
    wherein the switch plate toggles from the open position to the valve closed position when the pressure in the compliant chamber decreases to at or about the shut-off pressure, and the switch plate toggles from the valve closed position to the valve open position when the pressure in the compliant chamber increases to or about the fill pressure.

6. The valve assembly of claim 5, wherein the frame includes a linear section in axial alignment with the piston, a first arm and a second arm, wherein when in the first position, the first arm is adjacent the housing, the second arm is spaced away from the housing and the switch plate is in the valve open position, and wherein when in the second position, the second arm is adjacent the housing, the first arm is spaced away from the housing and the switch plate is in the valve closed position.

7. The valve assembly of claim 1, wherein the main valve and the pilot valve in fluid communication with each other.

8. The valve assembly of claim 1, wherein the pressure sensor and the pilot valve are in electronic communication with each other.

9. The valve assembly of claim 1 further comprising one or more detents restricting opening of the pilot valve until the fill pressure is reached and restricting closing of the pilot valve until the shut-off pressure is reached.

10. The valve assembly of claim 9 wherein the detent includes a magnetic, mechanical, or electromechanical detent.

* * * * *